(12) United States Patent
King et al.

(10) Patent No.: US 11,999,378 B2
(45) Date of Patent: Jun. 4, 2024

(54) CONTROL SYSTEM FOR A VEHICLE

(71) Applicant: JAGUAR LAND ROVER LIMITED, Coventry (GB)

(72) Inventors: Paul King, Loughborough (GB); Andrew Fairgrieve, Rugby (GB); Bineesh Ravi, Coventry (GB); Jithin Jayaraj, Coventry (GB); Krishna Jayaprakash, Coventry (GB); Jithesh Kotteri, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 495 days.

(21) Appl. No.: 17/278,265

(22) PCT Filed: Jul. 15, 2019

(86) PCT No.: PCT/EP2019/068943
§ 371 (c)(1),
(2) Date: Mar. 19, 2021

(87) PCT Pub. No.: WO2020/057801
PCT Pub. Date: Mar. 26, 2020

(65) Prior Publication Data
US 2021/0354725 A1  Nov. 18, 2021

(30) Foreign Application Priority Data

Sep. 20, 2018 (GB) ........................ 1815335
Sep. 20, 2018 (GB) ........................ 1815339

(51) Int. Cl.
*G06V 20/56* (2022.01)
*B60W 30/10* (2006.01)
(Continued)

(52) U.S. Cl.
CPC ........ *B60W 60/0011* (2020.02); *B60W 30/10* (2013.01); *B60W 40/06* (2013.01);
(Continued)

(58) Field of Classification Search
CPC ....... B60T 2210/16; B60W 2050/0075; B60W 2552/05; B60W 2556/10; B60W 30/10;
(Continued)

(56) References Cited

U.S. PATENT DOCUMENTS

2014/0257621 A1  9/2014  Zych
2017/0090478 A1* 3/2017  Blayvas ............... G06Q 10/04
(Continued)

FOREIGN PATENT DOCUMENTS

| DE | 102017203276 A1 | 9/2018 |
|---|---|---|
| EP | 2591443 A1 | 5/2013 |
| WO | 2018158020 A1 | 9/2018 |

OTHER PUBLICATIONS

A. Bar-Gill, P. Ben-Erza, and I.Y. Bar-Itzhack; "Improvement of terrain-aided navigation via trajectory optimization", Nov. 1994, IEEE Control System Technologies, vol. 2, No. 4, pp. 336-342 (Year: 1994).*

(Continued)

*Primary Examiner* — Jaime Figueroa
*Assistant Examiner* — Zachary Joseph Wallace
(74) *Attorney, Agent, or Firm* — Reising Ethington P.C.

(57) ABSTRACT

Embodiments of the present invention relate to a control system for a vehicle, the control system comprising at least one controller and being configured to: obtain image data relating to terrain to be traversed by the vehicle, and for each of a plurality of sub-regions of the image data: determine probability data relating to whether the respective sub-region relates to a path region or a non-path region of the terrain; and determine a cost for the vehicle to traverse a (Continued)

portion of the terrain to which the sub-region relates depending on the probability data meeting one or more path probability criteria indicating that the sub-region relates to the path region, one or more non-path probability criteria indicating that the sub-region relates to the non-path region or neither the path probability criteria nor the non-path probability criteria; and determining a vehicle path in dependence on the determined costs.

20 Claims, 19 Drawing Sheets

(51) Int. Cl.
  *B60W 40/06* (2012.01)
  *B60W 60/00* (2020.01)
(52) U.S. Cl.
  CPC ....... *G06V 20/588* (2022.01); *B60W 2552/05* (2020.02); *B60W 2556/10* (2020.02); *B60W 2556/50* (2020.02)
(58) Field of Classification Search
  CPC .............. B60W 40/06; B60W 60/0011; G05D 2201/0213; G05D 1/0246; G05D 1/0212; G06V 20/588
  See application file for complete search history.

(56) References Cited

U.S. PATENT DOCUMENTS

2017/0285648 A1 10/2017 Welty et al.
2018/0058858 A1* 3/2018 Bitan ................. G01C 21/3826

OTHER PUBLICATIONS

K. Alonzo et al., "Toward Reliable Off Road Autonomous Vehicles Operating in Challenging Environments", International Journal of Robotics Research, vol. 25, No. 5-6, May 1, 2006, pp. 449-483, XP055371697.
Y. Alon et al., "Off-road Path Following using Region Classification and Geometric Projection Constraints", Conference on Computer Vision and Pattern Recognition, vol. I, Jun. 17, 2006, pp. 689-696, XP010923026.
N. Seegmiller et al., "The Maverick Planner: An Efficient Hierarchical Planner for Autonomous Vehicles in Unstructured Environments", 2017 IEEE/RSJ International Conference on Intelligent Robots and Systems (IROS), Sep. 24, 2017, pp. 2018-2023, XP033266172.
International Search Report corresponding to International Application No. PCT/EP2019/068943, dated Aug. 29, 2019, 6 pages.
Written Opinion corresponding to International Application No. PCT/EP2019/068943, dated Aug. 29, 2019, 8 pages.
Combined Search and Examination Report corresponding to Great Britain Application No. GB1815339.5, dated Mar. 18, 2019, 6 pages.

* cited by examiner

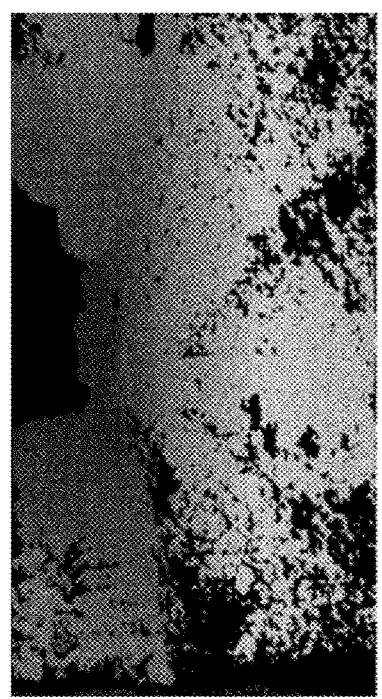
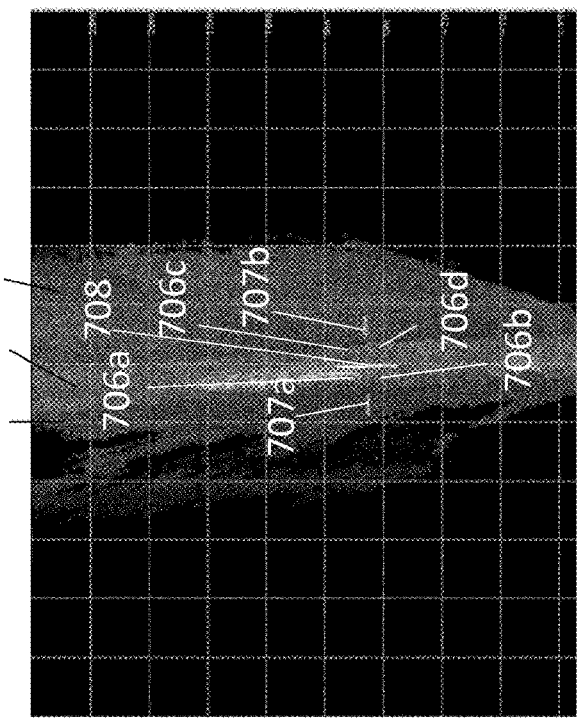
FIG. 8a
FIG. 8b
FIG. 8c

CONTROL SYSTEM FOR A VEHICLE

TECHNICAL FIELD

The present disclosure relates to a control system and particularly, but not exclusively, to a control system for a vehicle. Aspects of the invention relate to a control system, to a method, to a vehicle, to a computer program product and to a non-transitory computer readable medium.

BACKGROUND

Vehicles with increasing levels of autonomy require detailed information with respect to their driving environment. In structured on-road environments there are known markers for the vehicle to identify (e.g. lane markings, road signs, road edges). In off-road environments, this becomes more complex. Some vehicle control systems use cameras to detect images of the driving environment and, based on the images, categorise portions of the terrain to be traversed by the vehicle into different categories in an attempt to apply some structure to the off-road environment. However, existing systems struggle to categorise the terrain correctly, particularly in variable lighting conditions, such as when shadows are cast on the terrain.

It is an object of embodiments of the invention to at least mitigate one or more of the problems of the prior art.

SUMMARY OF THE INVENTION

Aspects and embodiments of the invention provide a control system, a method, a vehicle and a non-transitory computer readable medium as claimed in the appended claims.

According to an aspect of the invention, there is provided a control system for a vehicle, the control system being configured to determine a future path for the vehicle across a terrain. Typically the control system is configured to determine the future path in dependence on image data captured by one or more image sensors of the vehicle.

According to an aspect of the invention, there is provided a control system for a vehicle, the control system being configured to obtain image data relating to terrain to be traversed by the vehicle, and for each of a plurality of sub-regions of the image data: determine probability data relating to whether the respective sub-region relates to a path region or a non-path region of the terrain; and determine a cost for the vehicle to traverse a portion of the terrain to which the sub-region relates depending on the probability data meeting one or more path probability criteria indicating that the sub-region relates to the path region, one or more non-path probability criteria indicating that the sub-region relates to the non-path region or neither the path probability criteria nor the non-path probability criteria.

According to an aspect of the invention, there is provided a control system for a vehicle. The control system may be configured to determine a (typically future) vehicle path for a vehicle to traverse terrain. The control system may be configured to determine whether probability data relating to each of a plurality of respective portions of terrain to be traversed by the vehicle meet one or more path probability criteria indicating that it relates to a path region of the terrain, one or more non-path probability criteria indicating that it relates to a non-path region of the terrain or neither the path probability criteria nor the non-path probability criteria. The control system may be configured to determine costs for the vehicle to traverse the respective portions of the terrain in dependence on the said determinations. The control system may be configured to determine a (typically future) vehicle path in dependence on the determined costs.

According to another aspect of the invention, there is provided a control system for a vehicle. The control system may comprise at least one controller. The control system may be configured to obtain image data relating to terrain to be traversed by the vehicle, and for each of a plurality of sub-regions of the image data: determine probability data relating to whether the respective sub-region relates to a path region or a non-path region of the terrain; allocate a cost to the said sub-region according to an at least three-tiered cost allocation structure in dependence on the probability data; and determine a (typically future) vehicle path in dependence on the allocated costs.

It will be understood that the vehicle path is a path for the vehicle to traverse the terrain.

It may be that the control system is configured to allocate different costs to the respective sub-regions in dependence on the probability data meeting one or more path probability criteria indicating that the sub-region relates to the path region, one or more non-path probability criteria indicating that the sub-region relates to the non-path region or neither the path probability criteria nor the non-path probability criteria.

According to another aspect of the invention, there is provided a control system for a vehicle, the control system comprising at least one controller and being configured to:
 obtain image data relating to terrain to be traversed by the vehicle, and for each of a plurality of sub-regions of the image data:
  determine probability data relating to whether the respective sub-region relates to a path region or a non-path region of the terrain; and
  determine a cost for the vehicle to traverse a portion of the terrain to which the sub-region relates depending on the probability data meeting one or more path probability criteria indicating that the sub-region relates to the path region, one or more non-path probability criteria indicating that the sub-region relates to the non-path region or neither the path probability criteria nor the non-path probability criteria; and
 determining a (typically future) vehicle path in dependence on the determined costs.

By determining a cost for the vehicle to traverse a portion of the terrain to which each said sub-region relates in dependence on whether the probability data meets one or more path probability criteria, one or more non-path probability criteria or neither, more accurate costs can be determined for the vehicle to traverse the said portions of the terrain and a more optimal vehicle path can thus be determined in dependence on the determined costs.

For example, it may be that the path region of the terrain to which the image data relates comprises a shadowed portion, such as a portion of a path under a shadow of a tree or bush. It may be that the control system is configured to determine, based on the probability data, that the shadowed portion of the path region does not meet either one or more path probability criteria or one or more non-path probability criteria. It may be that this causes an intermediate cost between a cost associated with a path region and a cost associated with a non-path region to be determined for the shadowed portion of the path region. In this case, it may be that the determined (e.g. lowest cost) vehicle path comprises a shadowed portion of the path region. Conversely, if a shadowed path region was instead categorised as a non-path region of the terrain, the determined (e.g. lowest cost) vehicle path would not typically traverse such a shadowed path region, which may cause a less optimal vehicle path to be determined.

It may be that the probability data meeting neither one or more path probability criteria nor one or more non-path probability criteria is indicative that it cannot be determined from the probability data with sufficient confidence that the sub-region relates to the path region or the non-path region of the terrain.

It may be that each of the sub-regions of the image data comprises more than one pixel of the said image data. It may be that the image data comprises two-dimensional (2D) image data. It may be that the image data comprises colour image data. It may be that the determined costs for each of the said sub-regions do not account for obstacles of the terrain. It may be that the control system is configured to obtain the said image data from one or more image sensors of the vehicle.

It will be understood that the term "cost" may relate to a penalty or a reward associated with a portion of the terrain to be traversed by the vehicle. An increased or relatively high cost may relate to an increased or relatively high penalty or a reduced or relatively low reward. Similarly a reduced or relatively low cost may relate to a reduced or relatively low penalty or an increased or relatively high reward. An intermediate cost may relate to a cost or reward between a relatively low penalty and a relatively high penalty, between a relatively low reward and a relatively high reward, or between a penalty and a reward.

It may be that the control system is configured to operate in an autonomous driving mode, such as a driving mode having level 1, 2, 3, 4 or 5 autonomy (e.g. level 2 autonomy). It may be that the control system is configured to operate in an autonomous off-road driving mode. It may be that the control system is configured to operate in an autonomous low-speed cruise control driving mode, or in both an autonomous low-speed cruise control driving mode and an off-road driving mode.

It may be that the terrain is off-road terrain.

It may be that the functionality of the control system is performed by the at least one controller. It may be that the at least one controller is implemented in hardware, software, firmware or any combination thereof. It may be that the at least one controller comprises one or more electronic processors. It may be that one or more or each of the electronic processors are hardware processors. It may be that the at least one controller comprises or consists of an electronic control unit.

It may be that the at least one controller collectively comprises:
  at least one electronic processor having an input for receiving the image data; and
  at least one electronic memory device electrically coupled to the at least one electronic processor having instructions stored therein,
  wherein the at least one electronic processor is configured to access the at least one memory device and execute the instructions thereon so as to determine the probability data, the cost data and the vehicle path.

It may be that the control system is configured to control the vehicle in dependence on the determined vehicle path, e.g. in an autonomous driving mode.

It may be that the control system is configured to control a steering angle of one or more wheels associated with the vehicle in dependence on the determined vehicle path, e.g. in an or the autonomous driving mode. By autonomously controlling the steering angle in dependence on the determined vehicle path, the vehicle can be directed autonomously along the vehicle path. It may be that the control system is configured to control a speed of the vehicle in dependence on the determined vehicle path, e.g. in an or the autonomous driving mode. By (autonomously) controlling the speed of the vehicle in dependence on the determined vehicle path, an optimal vehicle speed can be autonomously selected for the vehicle to safely and comfortably traverse the vehicle path.

It may be that the control system is configured to, for each of the said sub-regions, determine a different cost (e.g. a different cost per unit distance or a different cost per unit time) for the respective sub-region depending on whether the probability data meets one or more path probability criteria, one or more non-path probability criteria or neither the path probability criteria nor the non-path probability criteria. Advantageously, determining different costs for sub-regions determined to relate to path regions of the terrain, non-path regions of the terrain and regions of the train which cannot be conclusively classified as either path regions of the terrain or non-path regions of the terrain allows a more optimal vehicle path to be determined.

It may be that the control system is configured, for each of the said sub-regions, to determine the probability data by: determining, from the image data, image content data relating to the said sub-region; and comparing the image content data to a path model relating to the path region of the terrain. It will be understood that, the greater the correlation between the image content data and the path model, the more indicative the probability data is that the respective sub-region relates to a path region of the terrain (and vice versa).

It may be that the image content data is indicative of a colour content of the sub-region. It may be that the image content data is indicative of a texture content of the sub-region. It may be that the image content data is indicative of a colour and texture content of the sub-region.

It may be that the path model is dependent on historical image data relating to the terrain. Advantageously by the path model being dependent on historical image data relating to the terrain, an accurate, stable, customised path model can be generated for the path of the terrain to be traversed by the vehicle. This helps to more accurately determine whether a sub-region of the image data is likely to relate to a path region of the terrain.

It may be that the vehicle has a plurality of wheels. It may be that each of the said wheels is fitted with a respective tyre. It may be that the path model is based on tyre region image data relating to locations on the terrain of one or more tyres of the vehicle. Advantageously, locations on the terrain of one or more tyres of the vehicle provide an accurate reference on which the path model can be based as it can generally be assumed that the vehicle tyres will be provided on a path region of the terrain, for example when the control system enters an autonomous driving mode.

It may be that the control system is configured to determine (e.g. update) the path model in dependence on one or more of the said sub-regions of the said image data relating to location(s) on the terrain of one or more tyres of the vehicle. It may be that the control system is configured to determine the one or more sub-regions of the said image data relating to location(s) on the terrain of one or more tyres of the vehicle in dependence on location data indicative of a location of the vehicle at a time after the image data was captured. Advantageously, this allows the tyre region image data to be determined from previously captured frames of image data.

It may be that the control system is configured to determine the said location data by performing visual odometry or inertial odometry in respect of the vehicle, or from satellite positioning data (e.g. Global Positioning System (GPS) data) indicative of the location of the vehicle. Advantageously, this generally allows existing sensors of the vehicle to be used to determine the said location data.

It may be that the control system is configured to, for each of the said sub-regions, determine the probability data by: determining, from the image data, image content data relating to the said sub-region; and comparing the image content data to a non-path model relating to a non-path region of the terrain. It will be understood that, the greater the correlation between the image content data and the non-path model, the more indicative probability data is that the respective sub-region relates to a non-path region of the terrain (and vice versa).

It may be that the path model is a mixture model. It may be that the path model is a Gaussian mixture model (GMM) or any other suitable statistical model. It may be that the non-path model is a mixture model. It may be that the non-path model is a Gaussian mixture model (GMM) or any other suitable statistical model.

It may be that the non-path model is dependent on historical image data relating to the terrain. Advantageously by the non-path model being dependent on historical image data relating to the terrain, an accurate, stable, customised non-path model can be generated for the specific terrain to be traversed by the vehicle. This helps to more accurately determine whether a sub-region of the image data is likely to relate to a non-path region of the terrain.

It may be that the non-path model is based on image data relating to one or more non-path regions of the terrain laterally offset from the vehicle. Advantageously, image data relating to one or more non-path regions of the terrain laterally offset from the vehicle typically provides an accurate reference on which the non-path model can be based as it can generally be assumed that the terrain on either side of the vehicle relates to non-path region, particularly when the vehicle is off-road.

It may be that the control system is configured to, for each of the said sub-regions: determine the probability data by: determining image content data from the said sub-region; comparing the image content data to a path model to determine path probability data relating to a probability that the sub-region relates to the path region of the terrain; comparing the image content data to a non-path model to determine non-path probability data relating to a probability that the sub-region relates to the non-path region of the terrain; and determining the said probability data based on the said path and non-path probability data.

It may be that the control system is configured to infer secondary path probability data from the non-path probability data, the secondary path probability data being indicative of whether the respective sub-region relates to the path region of the terrain. It may be that the control system is configured to determine the said probability data by combining the path probability data with the secondary path probability data. It may be that the control system is configured to determine the said probability data by applying different weights to the path probability data and the secondary path probability data and combining the weighted path probability data and the weighted secondary path probability data. It may be that the path probability data is given a more significant weight than the secondary path probability data. Alternatively, it may be that the control system is configured to combine the path probability data with the secondary path probability data by applying the same weights to the path probability data and the non-path probability data, or greater weight may be allocated to the non-path probability data. It may be that the control system is configured to determine the weight to be applied to the path probability data based on confidence data associated with one or more path boundaries determined from the path probability data (and optionally on confidence data associated with one or more path boundaries determined from the secondary path probability data). Similarly, it may be that the control system is configured to determine the weight to be applied to the secondary path probability data based on confidence data associated with one or more path boundaries determined from the secondary path probability data (and optionally on confidence data associated with one or more path boundaries determined from the path probability data). It may be that the path boundaries are boundaries between path and non-path regions of the terrain.

It may be that the control system is configured to, for each said sub-region, determine the probability data by offsetting the path probability data in dependence on the non-path probability data. It may be that probabilities of the non-path probability data are subtracted from corresponding probabilities of the path probability data.

It may be that the control system is configured to, for each of a plurality of candidate trajectories of the vehicle across the terrain: determine candidate trajectory cost data in dependence on the determined costs for the vehicle to traverse at least some of the sub-regions traversed by the candidate trajectory, the candidate trajectory cost data relating to a cost for the vehicle to traverse at least a portion of the respective candidate trajectory; and determine the (future) vehicle path by selecting a candidate trajectory from the said plurality of candidate trajectories in dependence on the candidate trajectory cost data.

Advantageously, the plurality of candidate trajectories is typically a sub-set of all the possible trajectories of the vehicle across the terrain. By determining costs for a sub-set of all the possible trajectories of the vehicle across the terrain, and determining (for example) the lowest cost path from the said sub-set, a vehicle path which is at least close to optimal can be determined more quickly and with less processing than if costs for all possible trajectories of the vehicle had to be determined.

It may be that the control system is configured to: obtain 3D data in respect of the terrain; and, for respective portions of the terrain relating to each of a plurality of the said sub-regions, determine the cost for the vehicle to traverse the respective portion of the terrain to which the respective sub-region relates in dependence on the 3D data.

It may be that the 3D data in respect of the terrain is determined (for example) from a stereo vision imaging system of the vehicle, or from a radar-based terrain ranging system, a laser-based terrain ranging system or an acoustic ranging system.

It may be that the at least one controller of the control system is configured to determine a cost map for the vehicle in dependence on the determined costs, wherein the cost map is defined with respect to a global reference. By defining the cost map with respect to a global reference, it is less processing intensive to update the cost map in real time, thereby also making it less processing intensive to for a future path to be determined for the vehicle in dependence on the cost map in real time. This enables improved autonomous driving of the vehicle, for example by a control system of the vehicle.

It may be that the cost map has an orientation defined with respect to a global orientation reference. In this case, the cost map typically does not rotate with the vehicle when the vehicle turns. That is, the cost map typically remains oriented with respect to the global orientation reference irrespective of an orientation of the vehicle.

The global orientation reference may, for example, be a magnetic pole of the earth.

It may be that the cost map is defined with respect to a globally referenced location. It may be that the cost map has a reference point associated with the globally referenced location. Typically the reference point is an origin of the cost map. Typically the globally referenced location is represented by globally referenced location co-ordinates.

It may be that the globally referenced location of the cost map changes in dependence on translation of the vehicle across the terrain.

It may be that the control system is configured to remove cost data from the cost map in dependence on a change of the globally referenced location. Typically the control system is configured to remove selected cost data from the cost map in dependence on a direction of movement of the globally referenced location.

It may be that the control system is configured to add cost data to the cost map in dependence on a change of the globally referenced location. Typically the control system is configured to add selected cost data to the cost map in dependence on a direction of movement of the globally referenced location.

It may be that the at least one controller comprises a controller configured to obtain first (e.g. sensor or cost) data referenced to a first globally referenced location and second (e.g. sensor or cost) data referenced to a second globally referenced location different from the first globally referenced location and to determine the cost map in dependence on the first and second data.

It may be that the first and second data are referenced to a or the global orientation reference.

It may be that the first data relates to a first orientation of the vehicle. It may be that the second data relates to a second orientation of the vehicle different from the first orientation. It may be that the first and/or second data comprises cost data relating to the cost for the vehicle to traverse at least a portion of a terrain. It may be that the first and/or second data comprises sensor data from respective environment sensors of the vehicle. It may be that the first data comprises data from a first electronic control unit of the vehicle. It may be that the second data comprises data from the first electronic control unit or from a second electronic control unit of the vehicle discrete from the first electronic control unit. It may be that the first and second electronic control units are asynchronous.

It may be that the controller is configured to: obtain location data relating to each of the first and second (e.g. sensor or cost) data; and determine the cost map in dependence on the location data.

It may be that the location data comprises the first and second globally referenced locations. It may be that the first and second globally referenced locations are locations of a portion of the vehicle providing a reference point, such as an origin, for a co-ordinate system of a vehicle sensor to which the said first and/or second data relates. It may be that the location data comprises a globally referenced location in respect of cost data (e.g. a cost map) of the respective first or second data.

It may be that the location data comprises satellite positioning data (e.g. Global Positioning System data) indicative of the location of the vehicle. It may be that the location data is determined by visual odometry or by inertial odometry.

According to another aspect of the invention there is provided a method of determining a vehicle path comprising:
obtaining image data relating to terrain to be traversed by the vehicle, and for each of a plurality of sub-regions of the image data:
determining probability data relating to whether the respective sub-region relates to a path region or a non-path region of the terrain; and
determining a cost for the vehicle to traverse a portion of the terrain to which the sub-region relates depending on the probability data meeting one or more path probability criteria indicating that the sub-region relates to the path region, one or more non-path probability criteria indicating that the sub-region relates to the non-path region or neither one or more path probability criteria nor one or more non-path probability criteria; and
determining a (future) vehicle path in dependence on the determined costs or outputting determined costs in dependence on which a vehicle path can be determined.

It may be that the method comprises any of the functionality performed by the control system discussed herein.

For example, it may be that the method comprises controlling the (e.g. steering or speed of the) vehicle in dependence on the determined vehicle path.

It may be that the method comprises determining, for each of the sub-regions, a different cost (e.g. a different cost per unit distance or a different cost per unit time) for the respective sub-region depending on whether the probability data meets one or more path probability criteria, one or more non-path probability criteria or neither the path probability criteria nor the non-path probability criteria.

It may be that the method comprises, for each of the said sub-regions, determining the probability data by: determining, from the image data, image content data relating to the said sub-region; and comparing the image content data to a path model relating to the path region of the terrain.

It may be that the method comprises determining the path model in dependence on one or more of the said sub-regions of the said image data relating to location(s) on the terrain of one or more tyres of the vehicle. It may be that the method comprises determining the one or more sub-regions of the said image data relating to location(s) on the terrain of one or more tyres of the vehicle in dependence on location data indicative of a location of the vehicle at a time after the image data was captured. It may be that the method comprises determining the said location data by performing visual odometry or inertial odometry in respect of the vehicle or from satellite positioning data (e.g. Global Positioning System data) indicative of the location of the vehicle.

It may be that the method comprises, for each of the said sub-regions, determining the probability data by: determining, from the image data, image content data relating to the said sub-region; and comparing the image content data to a non-path model.

It may be that the method comprises, for each of the said sub-regions: determining the probability data by: determining image content data from the said sub-region; comparing the image content data to a path model to determine path probability data relating to a probability that the sub-region relates to the path region of the terrain; comparing the image content data to a non-path model to determine non-path probability data relating to a probability that the sub-region relates to the non-path region of the terrain; and determining the said probability data based on the said path and non-path probability data.

It may be that the method comprises, for each of a plurality of candidate trajectories of the vehicle across the terrain: determining candidate trajectory cost data in dependence on the determined costs for the vehicle to traverse at least some of the sub-regions traversed by the candidate trajectory, the candidate trajectory cost data relating to a cost for the vehicle to traverse at least a portion of the respective candidate trajectory; and determining the (future) vehicle path by selecting a candidate trajectory from the said plurality of candidate trajectories in dependence on the candidate trajectory cost data.

It may be that the method comprises obtaining 3D data in respect of the terrain; and, for respective portions of the terrain relating to each of a plurality of the said sub-regions, determining the cost for the vehicle to traverse the respective portion of the terrain to which the respective sub-region relates in dependence on the 3D data.

It may be that the method comprises determining a cost map for the vehicle in dependence on the determined costs for the vehicle to traverse the sub-regions, wherein the cost map is defined with respect to a global reference.

It may be that the cost map has a reference point associated with a globally referenced location. It may be that the method comprises changing the globally referenced location of the cost map in dependence on translation of the vehicle across the terrain. Typically the cost map remains oriented with respect to the global reference.

It may be that the method comprises removing cost data from the cost map in dependence on a change of the globally referenced location. It may be that the method comprises adding cost data to the cost map in dependence on a change of the globally referenced location.

It may be that the method comprises: obtaining first (e.g. sensor or cost) data referenced to a first globally referenced location; obtaining second (e.g. sensor or cost) data referenced to a second globally referenced location different from the first globally referenced location; and determining the cost map in dependence on the first and second data.

It may be that the method comprises: obtaining location data relating to the first and second data; and updating the cost map in dependence on the location data.

According to a further aspect of the invention, there is provided a vehicle comprising a control system described herein.

According to a further aspect of the invention, there is provided a computer program product comprising computer readable instructions that, when executed by a computer, cause performance of a method described herein.

According to a further aspect of the invention, there is provided a non-transitory computer readable medium comprising computer readable instructions that, when executed by a processor, cause performance of a method described herein.

Another aspect of the invention relates to a cost map oriented with respect to a global reference.

According to a further aspect of the invention, there is provided a control system for a vehicle, the control system comprising a controller configured to:
 obtain (e.g. receive or retrieve from a memory) first data referenced to a first globally referenced location;
 obtain (e.g. receive or retrieve from a memory) second data referenced to a second globally referenced location different from the first globally referenced location; and
 determine a cost map relating to the cost for the vehicle to traverse terrain in dependence on the first and second data,
 wherein the cost map is defined with respect to a global reference.

By referencing the first and second data to globally referenced locations, and defining the cost map with respect to a global reference, it is less processing intensive to update the cost map in dependence on the first and second data in real time, thereby also making it less processing intensive to for a future path to be determined for the vehicle in dependence on the cost map in real time. This enables improved autonomous driving of the vehicle, for example by a control system of the vehicle.

Accordingly, it may be that the control system is configured to determine a future path for the vehicle in dependence on the cost map, e.g. in an autonomous driving mode. It may be that the control system is configured to control the (e.g. steering and/or speed of the) vehicle in dependence on the future path, e.g. in an autonomous driving mode.

It may be that the control system is configured to, for each of a plurality of candidate trajectories of the vehicle across the terrain: determine candidate trajectory cost data for the vehicle to traverse at least a portion of the respective candidate trajectory in dependence on the cost map; and determine the (future) vehicle path by selecting a candidate trajectory from the said plurality of candidate trajectories in dependence on the candidate trajectory cost data.

It may be that the cost map has an orientation defined with respect to a global orientation reference. In this case, the cost map typically does not rotate with the vehicle when the vehicle turns. That is, the cost map typically remains oriented with respect to the global orientation reference irrespective of an orientation of the vehicle. Advantageously, this makes it easier for the controller to combine the first and second data.

It may be that the first and second data are referenced to a or the global orientation reference.

It may be that the first data relates to a first orientation of the vehicle.

It may be that the second data relates to a second orientation of the vehicle different from the first orientation.

It may be that the cost map is defined with respect to a globally referenced location.

It may be that the first data comprises data from a first electronic control unit of the vehicle.

It may be that the second data comprises data from a second electronic control unit of the vehicle discrete from the first electronic control unit.

It may be that the first and second electronic control units are asynchronous.

It may be that the controller is configured to obtain location data relating to each of the first and second data. It may be that the location data comprises the first and second globally referenced locations. It may be that the first and second globally referenced locations are locations of a portion of the vehicle providing a reference point, such as an origin, for a co-ordinate system of a vehicle sensor to which the said first and/or second data relates. It may be that the location data comprises a globally referenced location in respect of cost data (e.g. a cost map) relating to the respective first or second data.

It may be that the controller is configured to update the cost map with reference to the location data.

It may be that the location data is determined by visual odometry or by inertial odometry. It may be that the location data comprises satellite positioning data.

It may be that the first and/or second data comprises cost data relating to the cost for the vehicle to traverse at least a portion of a terrain.

It may be that the first and/or second data comprises sensor data from respective environment sensors of the vehicle.

The global orientation reference may, for example, be a magnetic pole of the earth.

It may be that the cost map has a reference point associated with a globally referenced location. Typically the reference point is an origin of the cost map.

Typically the globally referenced location is represented by globally referenced location co-ordinates.

It may be that the controller is implemented in hardware, software, firmware or any combination thereof. It may be that the controller comprises one or more electronic processors. It may be that one or more or each of the electronic processors are hardware processors. It may be that the controller comprises or consists of an electronic control unit.

According to a further aspect of the invention, there is provided a method of controlling a vehicle, the method comprising:
- obtaining (e.g. receiving or retrieving from a memory) first data referenced to a first globally referenced location;
- obtaining (e.g. receiving or retrieving from a memory) second data relating to a second globally referenced location different from the first globally referenced location; and
- determining a cost map in dependence on the first and second data;
- wherein the cost map is defined with respect to a global reference.

It may be that the method comprises controlling the vehicle in dependence on the cost map, e.g. in an autonomous driving mode. For example, it may be that the method comprises controlling a steering angle of one or more wheels associated with the vehicle in dependence on the cost map, e.g. in an or the autonomous driving mode. It may be that the method comprises controlling a speed of the vehicle in dependence on the cost map, e.g. in an or the autonomous driving mode. Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment or aspect can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which:

FIG. 8a illustrates a 2D image captured by one of the cameras of the stereoscopic camera system of the vehicle of FIG. 1; FIG. 8b illustrates a disparity image indicative of the differences between images obtained from the first and second cameras of the stereoscopic camera system of the vehicle of FIG. 1; and FIG. 8c shows in plan view the pixels of the image of FIG. 8a overlaid on a 3D grid obtained based on the disparity image of FIG. 8b;

FIG. 9a is identical to FIG. 8c); FIG. 9h shows the final path boundary determined from the merged path probability map of FIG. 9g;

DETAILED DESCRIPTION

Figure 1:
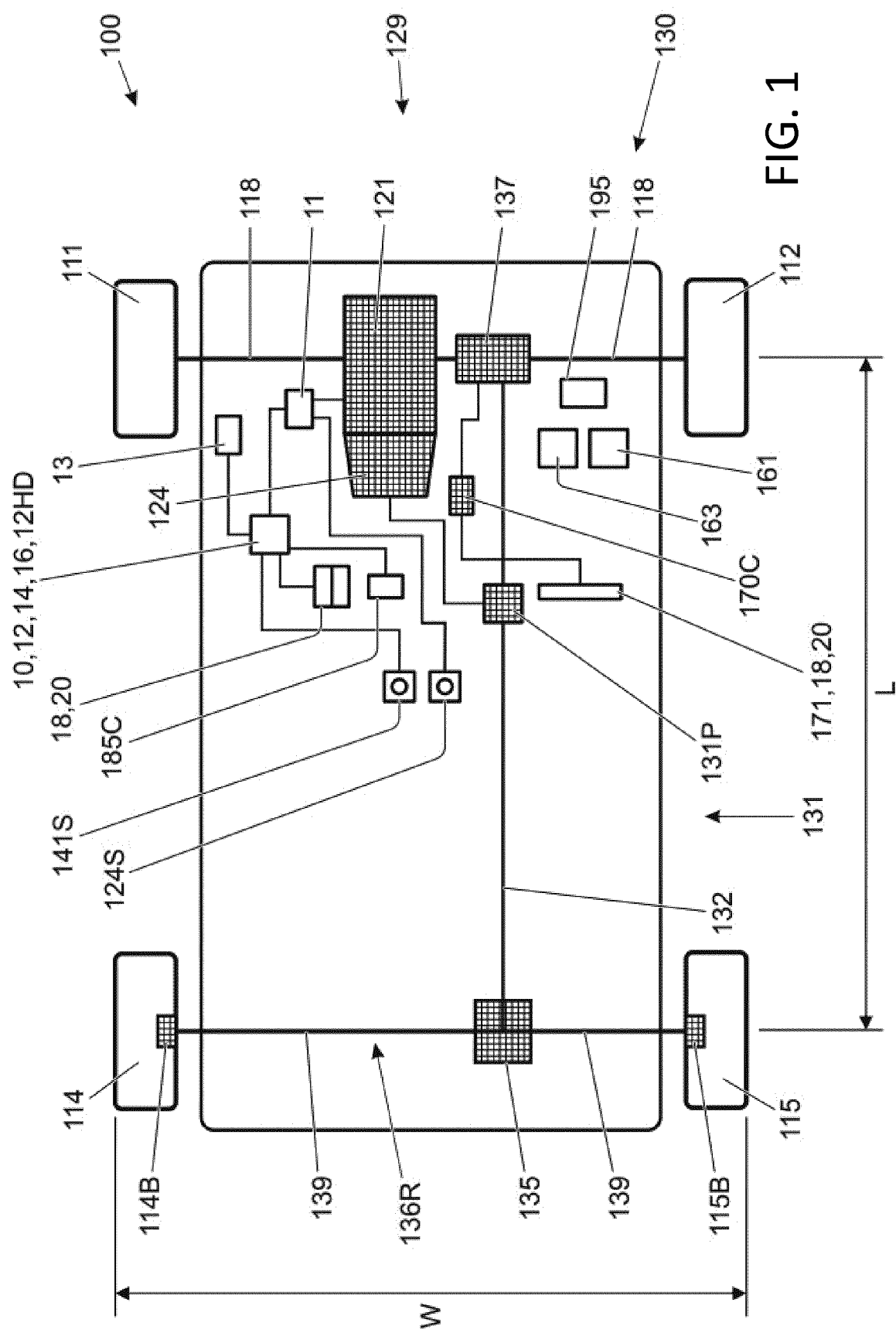
FIG. 1 shows a schematic illustration of a vehicle in plan view.
Figure 2:
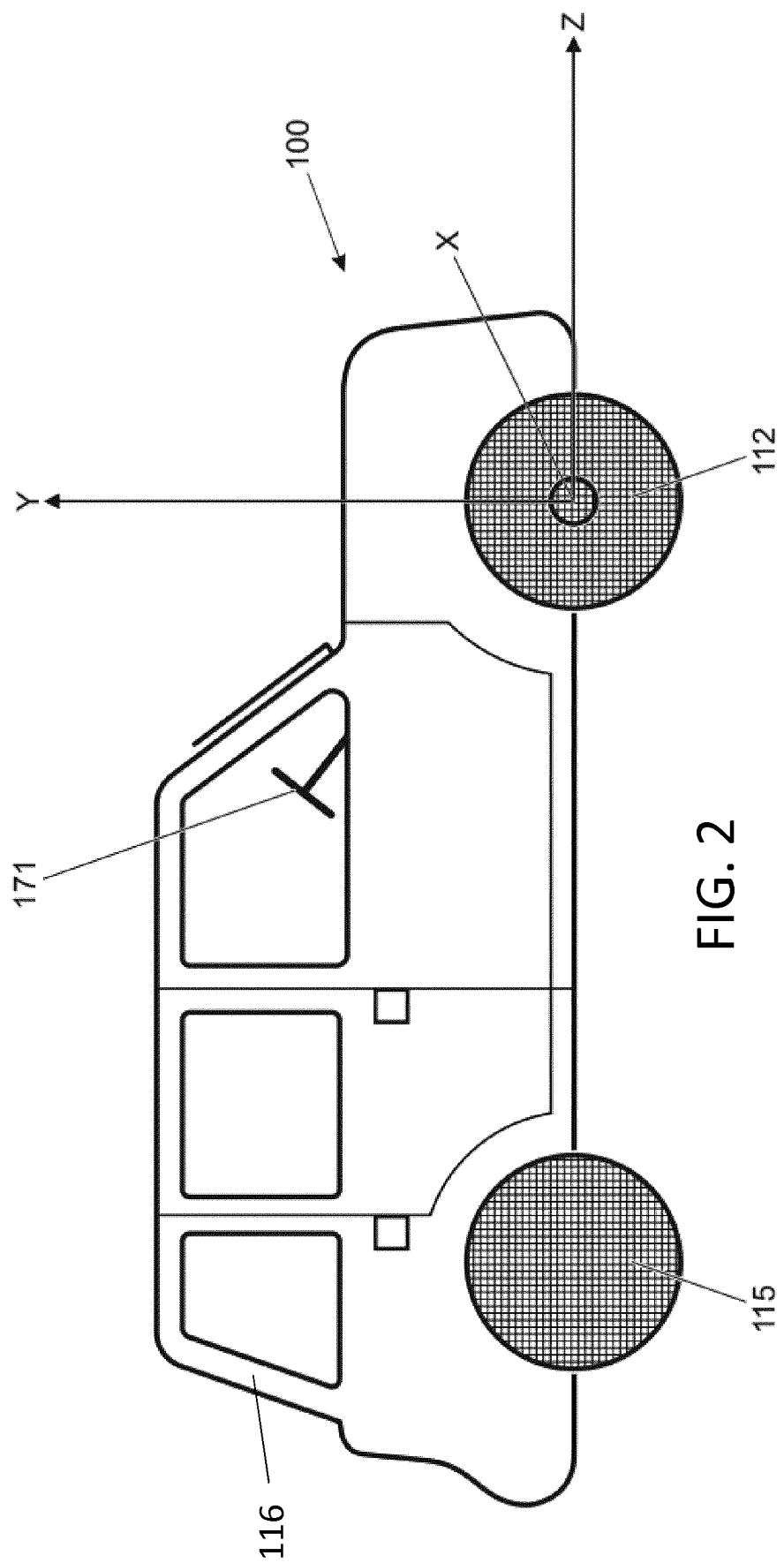
FIG. 2 shows the vehicle of FIG. 1 in side view.
Figure 3:
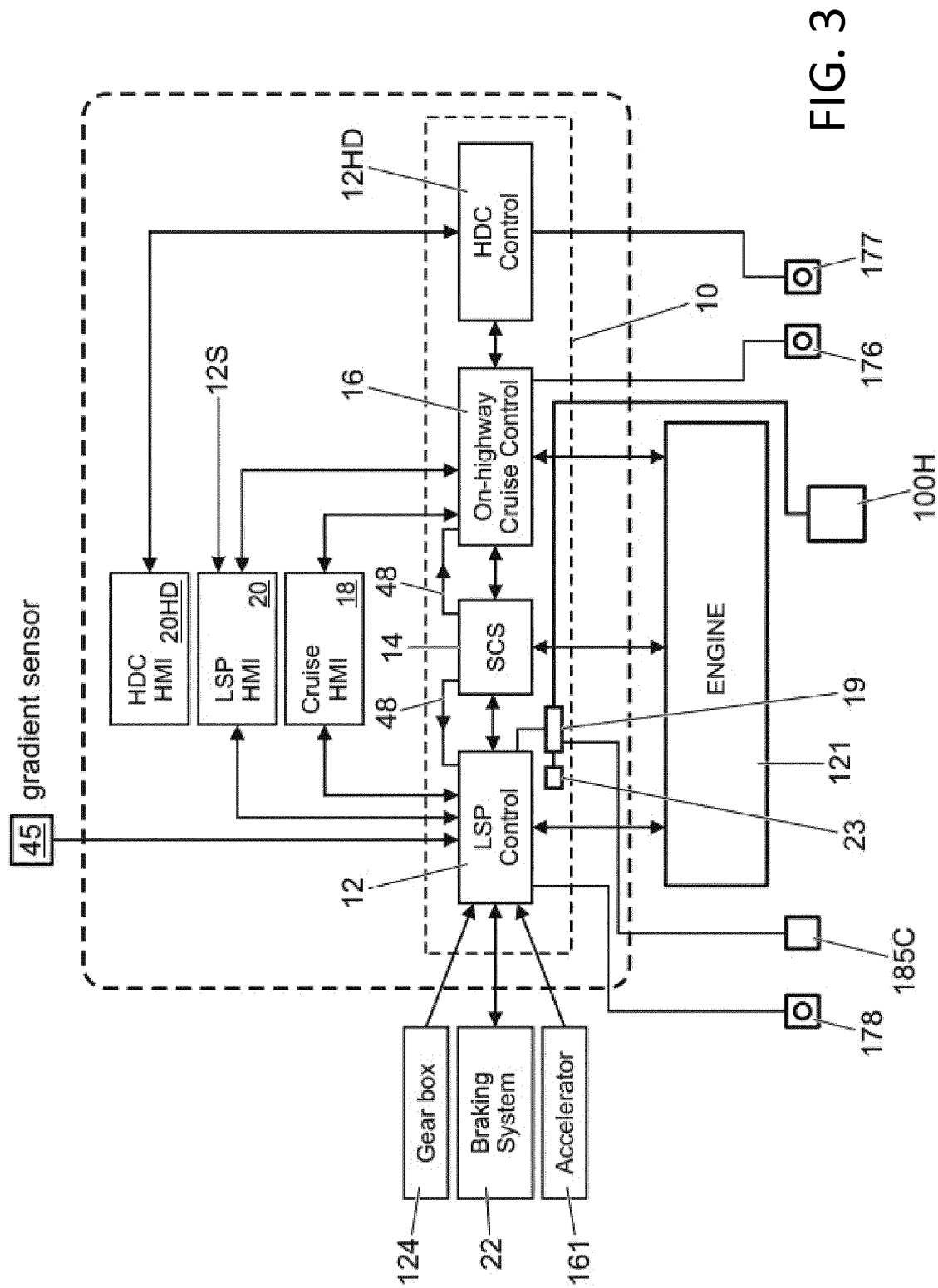
FIG. 3 is a high level schematic diagram of the vehicle speed control system of the vehicle of FIGS. 1 and 2, including a cruise control system and a low-speed progress control system.

FIGS. 1 and 2 show a vehicle 100 having wheels 111, 112, 114, 115, each of which is fitted with a respective tyre, and a body 116 carried by the wheels 111, 112, 114, 115. The vehicle 100 has a powertrain 129 that includes an engine 121 that is connected to a driveline 130 having an automatic transmission 124. A control system for the vehicle engine 121 includes a central controller, referred to as a vehicle control unit (VCU) 10, a powertrain controller 11, a brake controller 13 (an anti-lock braking system (ABS) controller) and a steering controller 170C. The ABS controller 13 forms part of a braking system 22 (FIG. 3). Each of the controllers 10, 11, 13, 170 comprises one or more electronic processors and a memory device storing computer program instructions, the one or more electronic processors being configured to access the respective memory device and to execute the computer program instructions stored therein to thereby perform the functionality attributed to that controller 10, 11, 13, 170.

The VCU 10 may receive and output a plurality of signals to and from various sensors and subsystems (not shown) provided on the vehicle. Referring to FIG. 3, the VCU 10 may include a low-speed progress (LSP) control system 12 shown in FIG. 3, a stability control system (SCS) 14, a cruise control system 16 and a hill descent control (HDC) system 12HD. The SCS 14 improves the safety of the vehicle 100 by detecting and managing loss of traction or steering control. When a reduction in traction or steering control is detected, the SCS 14 may be operable automatically to command the ABS controller 13 to apply one or more brakes of the vehicle to help to steer the vehicle 100 in the direction the user wishes to travel. Although the SCS 14 is implemented by the VCU 10 in this case, the SCS 14 may alternatively be implemented by the ABS controller 13.

Figure 4:
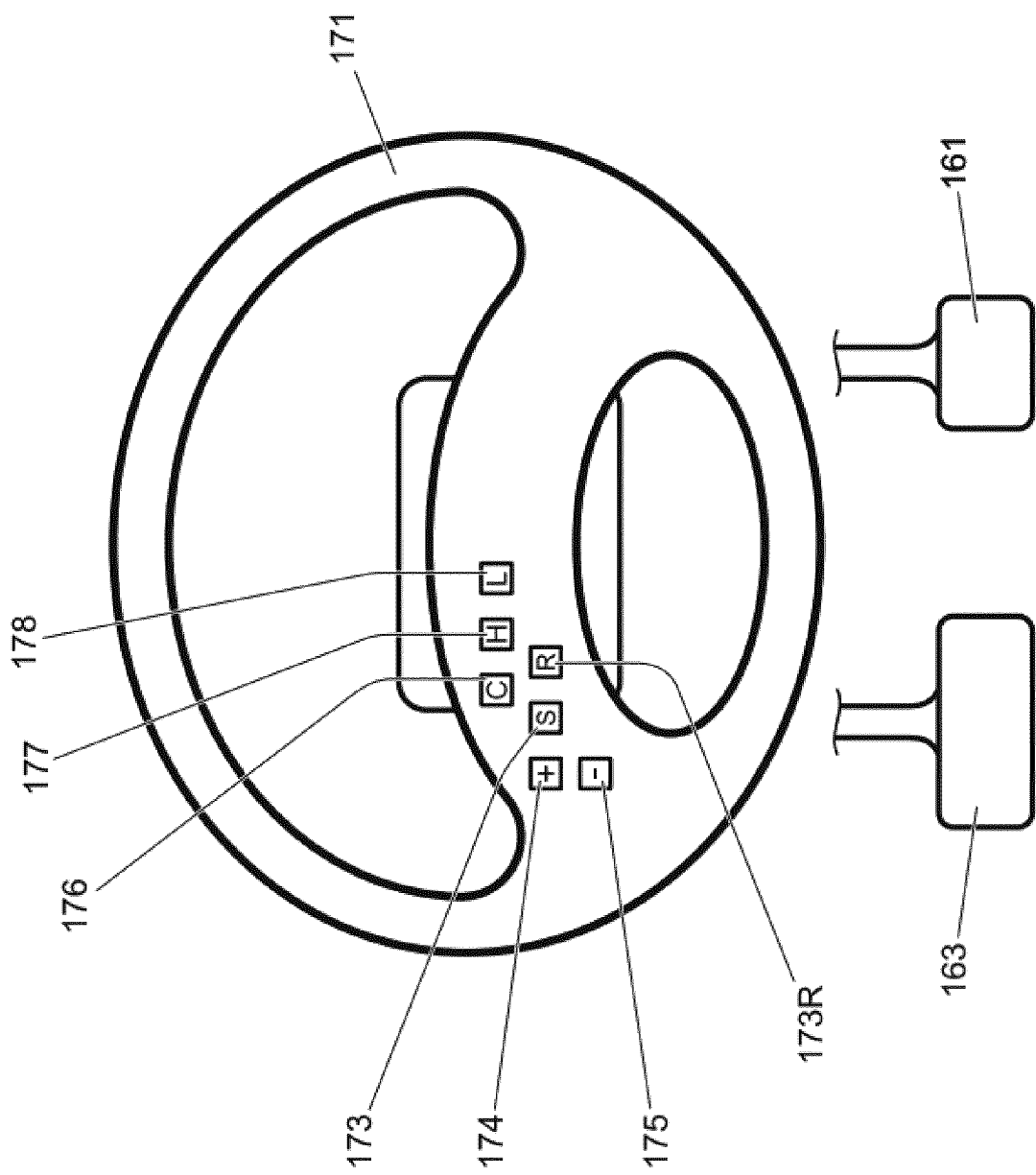
FIG. 4 illustrates a steering wheel of the vehicle of FIGS. 1, 2.

The cruise control system 16 may be operable to automatically maintain vehicle speed at a selected speed when the vehicle is travelling at speeds in excess of 25 kph. The cruise control system 16 may be provided with a cruise control HMI (human machine interface) 18 by which means the user can input a target vehicle speed to the cruise control system 16. In one embodiment of the invention, cruise control system input controls are mounted to a steering wheel 171. This is illustrated in FIG. 4. The cruise control system 16 may monitor vehicle speed and any deviation from the target vehicle speed may be adjusted automatically so that the vehicle speed is maintained at a substantially constant value, typically in excess of 25 kph. It may be that the cruise control system 16 is not effective at speeds lower than 25 kph. The cruise control HMI 18 may be configured to provide an alert to the user about the status of the cruise control system 16 via a visual display of the HMI 18.

The LSP control system 12 may also provide a speed-based control system for the user which enables the user to select a relatively low target speed at which the vehicle can progress without any pedal inputs being required by the user to maintain vehicle speed. It may be that low-speed speed control (or progress control) functionality is not provided by the on-highway cruise control system 16 which operates only at speeds above 25 kph. The LSP control system 12 may be activated by pressing LSP control system selector button 178 mounted on steering wheel 171. The LSP system 12 may be operable to apply selective powertrain, traction control and braking actions to one or more wheels of the vehicle 100, collectively or individually.

The LSP control system 12 may be configured to allow a user to input a desired value of vehicle target speed in the form of a set-speed parameter, user_set-speed, via a low-speed progress control HMI (LSP HMI) 20 (FIG. 1, FIG. 3) which shares certain input buttons 173-175 with the cruise control system 16 and HDC control system 12HD (FIG. 4). Provided the vehicle speed is within the allowable range of operation of the LSP control system 12 (which may be the range from 2 to 30 kph although other ranges may be provided) and no other constraint on vehicle speed exists whilst under the control of the LSP control system 12, the LSP control system 12 may control vehicle speed in accordance with a LSP control system set-speed value LSP_set-speed which is set substantially equal to user_setspeed. The LSP HMI 20 may also include a visual display by means of which information and guidance can be provided to the user about the status of the LSP control system 12.

The LSP control system 12 may receive an input from the ABS controller 13 of the braking system 22 of the vehicle indicative of the extent to which the user has applied braking by means of the brake pedal 163. The LSP control system 12 may also receive an input from an accelerator pedal 161 indicative of the extent to which the user has depressed the accelerator pedal 161, and an input from the transmission or gearbox 124. Other inputs to the LSP control system 12 may include an input from the cruise control HMI 18 which is representative of the status (ON/OFF) of the cruise control system 16, an input from the LSP control HMI 20, and an input from a gradient sensor 45 indicative of the gradient of the driving surface over which the vehicle 100 is driving. In the present embodiment the gradient sensor 45 may be a gyroscopic sensor. In some alternative embodiments the LSP control system 12 may receive a signal indicative of driving surface gradient from another controller such as the ABS controller 13. The ABS controller 13 may determine gradient based on a plurality of inputs, optionally based at least in part on signals indicative of vehicle longitudinal and lateral acceleration and a signal indicative of vehicle reference speed (v_actual) being a signal indicative of actual vehicle speed over ground. The vehicle reference speed may be determined to be the speed of the second slowest turning wheel, or the average speed of all the wheels. Other ways of calculating vehicle reference speed may be used including by means of a camera device or radar sensor.

The VCU 10 may be configured to implement a Terrain Response (TR)® System in which the VCU 10 controls settings of one or more vehicle systems or sub-systems such as the powertrain controller 11 in dependence on a selected driving mode. The driving mode may be selected by a user by means of a driving mode selector 141S (FIG. 1) or it may be determined automatically by the VCU 10. The driving modes may also be referred to as terrain modes, terrain response (TR) modes, or control modes. In the embodiment of FIG. 1 five driving modes may be provided such as: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain, being terrain characterised at least in part by relatively high drag, relatively high deformability or compliance and relatively low surface coefficient of friction; a 'grass, gravel or snow' (GGS) driving mode suitable for driving over grass, gravel or snow, being relatively slippery surfaces (i.e. having a relatively low coefficient of friction between surface and wheel and, typically, lower drag than sand); a 'rock crawl' (RC) driving mode suitable for driving slowly over a rocky surface; and a 'mud and ruts' (MR) driving mode suitable for driving in muddy, rutted terrain. The latter four driving modes may be considered to be off-road driving modes.

In order to cause application of the necessary positive or negative torque to the wheels, the VCU 10 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed.

The vehicle 100 may be provided with additional sensors (not shown) which are representative of a variety of different parameters associated with vehicle motion and status. These may be inertial systems unique to the LSP or HDC control systems 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle 100 is travelling. The sensors (not shown) of the vehicle 100 may include, but are not limited to, sensors which provide continuous sensor outputs to the VCU 10, including any one or more of: wheel speed sensors; an ambient temperature sensor; an atmospheric pressure sensor; tyre pressure sensors; wheel articulation sensors; gyroscopic sensors to detect vehicular yaw, roll and pitch angle and rate; a vehicle speed sensor; a longitudinal acceleration sensor; an engine torque sensor (or engine torque estimator); a steering angle sensor; a steering wheel speed sensor; a gradient sensor (or gradient estimator); a lateral acceleration sensor which may be part of the SCS 14; a brake pedal position sensor; a brake pressure sensor; an accelerator pedal position sensor; longitudinal, lateral and vertical motion sensors; water detection sensors forming part of a vehicle wading assistance system (not shown). The vehicle 100 may further comprise a location sensor, such as a satellite positioning system (e.g. Global Positioning System (GPS), Galileo or GLONASS) receiver configured to receive signals from a plurality of satellites to determine the location of the vehicle.

The vehicle 100 may be provided with a stereoscopic camera system 185C configured to generate stereo colour image pairs by means of a pair of forward-facing colour video cameras comprised by the system 185C. The system 185C may further comprise one or more electronic processors and a memory device storing computer program instructions, the one or more electronic processors being configured to access the respective memory device and to execute the computer program instructions stored therein. A stream of dual video image data is fed from the cameras to the one or more processors of the system 185C which may access and execute instructions stored in the memory of the said system 185C to process the image data and repeatedly generate a 3D point cloud data set based on the images received. Alternatively the images may be obtained and processed by any processing system of the vehicle 100, such as the VCU 10. Each point in the 3D point cloud data set may correspond to a 3D coordinate of a point on a surface of terrain ahead of the vehicle 100 viewed by each of the forward-facing video cameras of the stereoscopic camera system 185C.

The LSP control system 12 may have an autonomous driving mode in which the VCU 10 controls the steering and speed of the vehicle autonomously. In this case, the LSP HMI 20 may allow the driver to select the autonomous driving mode. The autonomous driving mode may be have a level of automation of level 1 or above by the SAE International standard. The autonomous mode may have level 2 autonomy, that is: the automated system takes full control of the vehicle (accelerating, braking, and steering); the driver must monitor the driving and be prepared to intervene immediately at any time if the automated system fails to respond properly. Thus, the speed of the vehicle 100 set by the user in the LSP mode may be overridden (typically reduced) by the VCU 10, for example, if it is inappropriate for driving conditions (e.g. if there are obstacles in the path, or if the set speed is inappropriate for the curvature of the vehicle path).

It may be that the autonomous LSP driving mode is particularly suitable for controlling the vehicle off-road, where road markings and road signs are either absent or sparsely provided. Accordingly, as well as operating in the autonomous LSP driving mode, it may be that the vehicle is also operating in one of the off-road TR driving modes. However, the autonomous LSP driving mode may also be suitable for controlling the vehicle on road.

As will be explained below with reference to FIG. 5, when the vehicle is operating in the autonomous LSP driving mode, the stereoscopic camera system 185C may be configured to use the colour image pairs to determine cost data relating to the terrain and to provide the cost data to the VCU 10. The VCU 10 may then determine a future path of the vehicle 100 in dependence on the cost data and control the vehicle 100 in accordance with the determined path. For example, the steering angle of one or more wheels of the vehicle 100 may be controlled by the VCU 10 outputting a steering angle control signal to the steering controller 170C dependent on the curvature of the determined path. The VCU 10 may store in an electronic memory thereof a look-up table of predetermined maximum allowable vehicle speeds for different path curvatures, and the VCU 10 may select an appropriate vehicle speed from the look-up table in dependence on the curvature of the determined path, and output this speed to the LSP control system 12 to override the user_setspeed.

A method for determining a future path of the vehicle to traverse (e.g. off-road) terrain based on respective frames of image data from the stereoscopic camera system 185C will now be explained with reference to FIG. 5. At 500, a stereo colour image pair may be captured by the stereoscopic camera system 185C and RGB image data from the stereo colour image pair may be stored in a memory accessible to the one or more electronic processors of the stereoscopic camera system 185C. At 502*a*, the stereoscopic camera system 185C may select the image data of a first image of the image pair (which is a 2D colour image) and at 504*a* may convert the selected image from the RGB colour space to the LAB colour space (although 504*a* is not essential, and other colour spaces such as RGB or HSV may alternatively be used). At 502*b*, the camera system 185C may compare the first and second images of the image pair to thereby determine a disparity image.

At 504*b*, the stereoscopic camera system 185C may calculate a real-world 3D point cloud based on the disparity image. The 3D point cloud may initially be related to a frame of reference of the camera system 185C, but may then be translated to a frame of reference of the vehicle 100 before being translated to a frame of reference which is fixed with respect to the earth (rather than with respect to the vehicle 100), for example by reference to vehicle orientation information provided by the vehicle's inertial measurement unit (IMU) 23. The 3D point data cloud typically has a high number of points. The number of points of the 3D point data cloud may be reduced by the camera system 185C determining a 3D grid (by a method such as multi-level surface (MLS)) map from the 3D point data cloud mapped relative to a horizontal ground plane. It may be that the surface of the terrain is inclined or shifted with respect to the horizontal ground plane. The 3D grid map may comprise one or more metrics in respect of each of a plurality of 3D blocks of the 3D point cloud, the metrics typically including information relating to the slope of the terrain and the elevation of the features of the terrain within that block.

At 506, the stereoscopic camera system 185C may overlay the LAB (or RGB or HSV, for example) pixels derived from the first image of the stereo image pair onto the 3D grid map.

It may be that the (e.g. off-road) terrain to be traversed by the vehicle comprises a path region (e.g. a paved portion or mud ruts provided through a grass field) and a non-path region (e.g. grass on either side of the ruts, or on either side of the paved portion). At 508*a*-516*a*, the one or more processors of the stereoscopic camera system 185C may execute computer program instructions on the image data determined at 506 to determine probabilities that respective portions of the terrain relate to the path region thereof.

The image data may be divided by the camera system 185C into a plurality of sub-regions. It may be that each of the sub-regions relates to a 25 cm×25 cm region of the terrain. Thus, it may be that each of the sub-regions comprise a plurality of pixels of image data. At 508*a*, an assumption may be made that the tyres of the vehicle are located on a path region of the terrain. Because the vehicle 100 is moving, the current location of the vehicle will differ from the location of the vehicle when the image data was captured. Accordingly, the image data may comprise image data corresponding to the current locations of the tyres of the vehicle 100. The camera system 185C may determine the current location of the vehicle 100 relative to the location of the vehicle 100 when the image data was captured, e.g. by performing visual odometry or inertial odometry on the image data and/or inertia data from the IMU 23, or using satellite positioning data (such as Global Positioning System (GPS) data) indicative of the location of the vehicle 100, and identify one or more sub-regions of the image data corresponding to the locations of the terrain currently contacted by the tyres of the vehicle 100 based on the current location of the vehicle. In the following description it will be assumed that one sub-region of the image data is identified for each tyre, but it will be understood that more than one sub-region may be identified for each tyre (depending on the relative sizes of the portion of the tyre in contact with the terrain and the sub-regions).

Figure 6:
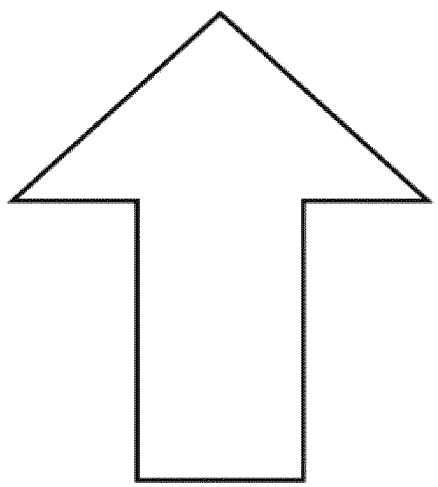
FIG. 6 illustrates the manner in which a colour and/or texture descriptor $p\_i$ may be generated.

At 510*a*, the camera system 185C may be configured to process the sub-regions of the image data corresponding to the locations currently occupied by the tyres of the vehicle 100 to determine tyre region image content data relating to each of those tyre regions. The image content data may comprise colour image content data relating to the colour content of the respective sub-regions. Additionally or alternatively, the image content data may comprise texture data relating to the texture content of the respective sub-regions. Texture is a measure of the local spatial variation in the intensity of the image and is generally measured by subtracting the intensity of a given pixel from the intensity of each of the eight surrounding pixels to provide eight texture descriptors per pixel. It may be that the image content data comprises a colour and texture descriptor, p_i, which contains eleven components for each pixel consisting of three L, a, b colour components and eight texture descriptors. An example of how a colour and texture descriptor, p_i, may be calculated in shown in FIG. 6, where subject pixel S of intensity $L_C$ is shown surrounded by pixels S1 to S8 of respective intensities Li to Ls. $L_C$, ac and be are the "LAB" colour components of pixel S. The set of weights $W_1$, $W_2$ and $W_3$ is used to balance how much to use colour, texture and brightness for image clustering.

By making the assumption that the tyre regions of the image data relate to a path region of the terrain, portions of the terrain which relate to path regions can be automatically identified. In addition, "path regions" comprising tyre tracks or mud ruts rather than paved paths can automatically be accounted for.

At 512*a*, the tyre region image content data may be merged with a global path model, such as a Gaussian mixture model (GMM), stored in a memory of the VCU 10. In some cases, it may be that more than one path model is provided (e.g. one for colour and one for texture), in which case 512*a* may be performed for each path model, but it will be assumed in the following description that a single global path GMM is provided. The global path GMM may be based on historical image data captured by the stereoscopic camera system 185C relating to historical locations of the terrain of the tyres of the vehicle 100.

Before the tyre region image content data is merged with the global path GMM, checks may be performed on the tyre region image content data to determine whether it is suitable for merger with the global path GMM. For example, the tyre region image content data relating to the location of each tyre may be compared to the tyre region image content data relating to the locations of each of the other tyres. If the tyre region image content data relating to a tyre does not meet one or more similarity criteria with respect to tyre region image content data relating to one or more of the other tyres, it may be that this is indicative that the tyre to which it relates does not in fact occupy a path region of the terrain, and it may be that the stereoscopic camera system 185C decides not to merge it with the global path GMM. If tyre region image content data relating to the tyres (or a sub-set of the tyres) do meet the similarity criteria with respect to each other, it may be that the camera system 185C updates the global path GMM in dependence on the tyre region image content data relating to those tyres.

It may be that the similarity criteria comprise one or more conditions relating to the tyre region image content data. For example, it may be that the similarity criteria comprise one or more conditions that the tyre region image content data relating to a tyre matches the tyre region image content data relating to one or more other tyres of the vehicle to at least a given degree. For example, it may be that the similarity criteria comprise one or more colour and/or texture conditions that colour and/or texture distributions of the tyre region image content data relating to a tyre matches the colour and/or texture distribution of the tyre region image content data relating to one or more other tyres. It will be understood that the image content data may be represented in any suitable way. For example, the image content data may comprise colour and/or texture components for each pixel of the sub-region, or the image content data may comprise a local GMM for that sub-region.

One or more tyres of the vehicle may occasionally enter a non-path region of the terrain while one or more other tyres of the vehicle remain on the path region of the terrain. By correlating tyre region image content data relating to different tyres of the vehicle and updating the global path GMM in dependence on there being a similarity between the tyre region image content data, cross-contamination of the global path GMM by tyre region image content data relating to a non-path region of the terrain can be reduced.

Additionally or alternatively, it may be that the tyre region image content data is compared to the global path GMM. If tyre region image content data meets one or more similarity criteria with respect to the global path GMM, the stereoscopic camera system 185C may update the global path GMM in accordance with the tyre region image content data. If the tyre region image content data does not meet the said similarity criteria with respect to the global path GMM, it may be an indication that the tyre region image content data does not in fact relate to the path region of the terrain, and that tyre region image content data is not merged with the global path GMM. This again helps to avoid cross-contamination of the path model by image data relating to a non-path region of the terrain.

In this case, it may be that the similarity criteria comprise one or more conditions relating to the tyre region image content data and global path GMM. For example, it may be that the similarity criteria comprise one or more colour and/or texture conditions that colour and/or texture distribution of the tyre region image content data matches the colour and/or texture distribution of the global path GMM to at least a given degree.

When the relevant tyre region image content data is merged with the global path GMM, an updated global path GMM may be provided. It will be understood that, the first time the method of FIG. 5 is performed, 512a may be omitted. Instead, it may be that the tyre region image content data relating to the locations of each of the tyres are compared to each other and the matching tyre region image content data is used to create a global path GMM.

If the tyre region image content data does not meet the said similarity criteria with respect to the global path GMM (or meets one or more dissimilarity criteria with respect to the global path GMM), the stereoscopic camera system 185C may exclude the tyre region image content data from the global path GMM. The stereoscopic camera system 185C may generate or update a second global path GMM (or any other suitable model) distinct from the said global path GMM based on the tyre region image content data. This helps the control system to accommodate changes in the terrain. For example, the control system may be configured to replace the global path GMM with the second global path GMM, for example in dependence on a determination that the path region of the terrain better matches the second path global path GMM.

At 514a, the updated global path GMM may be used to determine probabilities that the respective sub-regions of the image data (not only the tyre regions) relate to the path region of the terrain. The image content of each of the sub-regions of the image data may be compared to the distribution of the updated global path GMM in order to determine a probability that the respective sub-region relates to the path region. Thus, a single path probability value may be determined for each sub-region. The closer the image content to the peak of the distribution of the updated path GMM, the higher the probability that the sub-region relates to a path region of the terrain, and vice versa. It may be that the path probability determined for each sub-region is stored in a memory of the stereoscopic camera system 185C in association with the sub-region of the image data to which it relates.

At 516a, the camera system 185C may determine a path probability map in dependence on the determined path probabilities. It may be that the path probability map comprises the image data determined at 506 with the path probabilities for each of the sub-regions overlaid thereon.

At 508b-516b, the stereoscopic camera system 185C may execute computer program instructions on the image data determined at 506 to determine for each of the sub-regions a non-path probability that the respective sub-region relates to a non-path region of the terrain.

At 508b, two non-path regions laterally offset from the vehicle 100 are selected by the stereoscopic camera system 185C. It may be that the camera system 185C is configured to identify the non-path regions by determining image content data relating to each of a plurality of sub-regions of image data relating to a first portion of the terrain laterally offset from the vehicle 100 on a first (e.g. left) side of the vehicle 100 and to a second portion of the terrain laterally offset from the vehicle 100 on a second (e.g. right) side of the vehicle opposite the first side. For example, the sub-regions may relate to portions of the terrain between 3 m and 8 m laterally offset from the centre of the wheelbase line of the vehicle 100 on both sides of the vehicle 100 at its current location (as before the current location of the vehicle may be obtained by visual odometry or inertia odometry or from satellite positioning data (such as Global Positioning System (GPS) data) indicative of the location of the vehicle). As before, the image content data may comprise, for example, colour and/or texture data derived from the sub-region of image data. It may be that the camera system 185C is configured to compare the image content data relating to each of the selected laterally offset sub-regions to the global path GMM to thereby identify one or more of the sub-regions having an image content which meet one or more dissimilarity criteria with respect to the global path GMM. The camera system 185C may be configured to determine a lateral offset between the centre of the wheelbase line of the vehicle 100 at its current location and respective portions of the terrain to which the said one or more dissimilar sub-regions relate. For subsequent iterations of the method of FIG. 5 (for at least a limited time), the camera system 185C may be configured to determine the non-path sub-regions simply by determining sub-regions relating to portions of the terrain laterally offset from the vehicle by the lateral offset. Different lateral offsets may be determined for each side of the vehicle.

It may be that the dissimilarity criteria comprise one or more conditions relating to the image content data and the global path GMM. For example, it may be that the dissimilarity criteria comprise one or more colour and/or texture conditions that a colour and/or texture distribution of the image content data relating to a respective sub-region do not match corresponding distribution of the global path GMM to a given degree.

Thus, sub-regions relating to the non-path region of the terrain may be identified. By identifying the non-path regions with reference to the global path GMM, no user input needs to be requested by the VCU 10 in order to identify the non-path regions.

At 510*b*, image content data (e.g. the colour and/or texture data) relating to the non-path sub-regions may be determined. At 512*b*, the image content data relating to the non-path sub-regions may be merged with a global non-path model, such as a global non-path GMM. In some cases, it may be that more than one non-path model is provided (e.g. one for colour and one for texture), in which case 512*b* may be performed for each non-path model, but it will be assumed in the following description that a single global non-path GMM is provided. The global non-path GMM may be based on historical non-path image content data relating to portions of the terrain laterally offset from the vehicle on either side.

Before the image content data is merged with the global non-path GMM, checks may be performed on the non-path region image content data to determine whether it would contaminate or complement the global non-path GMM. For example, it may be that the camera system 185C compares the non-path region image content data to the global path GMM. If it is determined that the non-path region image content data meets one or more dissimilarity criteria with respect to the global path GMM, it may be that the camera system 185C merges the non-path image content data with the global non-path GMM. If it is determined that the non-path region image content data does not meet the one or more dissimilarity criteria with respect to the global path GMM, it may be that the camera system 185C decides not to merge the non-path region image content data with the global non-path GMM. Thus, an updated global non-path GMM may be obtained.

It will be understood that the first time 508*b*-512*b* are performed, step 512*b* may be omitted. In this case, the camera system 185C may be configured to merge the image content data obtained from the sub-regions laterally offset from the vehicle to form the global non-path GMM.

At 514*b*, the updated global non-path GMM may be used by the stereoscopic camera system to determine probabilities that the respective sub-regions of the image data (not only the sub-regions laterally offset from the vehicle) relate to the non-path region of the terrain. In this case, the image content of each of the sub-regions of the image data may be compared to the updated global non-path GMM to determine a probability that the respective sub-region relates to the non-path region of the terrain. The closer the image content data to the peak of the distribution of the updated non-path GMM, the higher the probability that the sub-region relates to the non-path region of the terrain, and vice versa. It may be that the probability is stored in a memory of the VCU 10 in association with the sub-region of the image data to which it relates.

At 516*b*, a non-path probability map is determined in dependence on the non-path probabilities. It may be that the non-path probability map comprises the image data determined at 506 with the non-path probabilities for each of the sub-regions overlaid thereon.

The global non-path GMM may be used to provide a further check on the tyre region image content data to determine whether it is suitable for merger with the global path GMM. The stereoscopic camera system may compare the tyre region image content data relating to the location of each tyre to the global non-path GMM and, in dependence on the tyre region image content data and the global non-path GMM meeting one or more dissimilarity criteria with respect to each other, the camera system 185C may update the path model in dependence on the tyre region image content data. If the tyre region image content data and the global non-path GMM do not meet one or more dissimilarity criteria with respect to each other, it may be that the camera system 185C does not use the tyre region image content data to update the global path GMM. This helps to reduce cross contamination of the global path GMM with image data relating to the non-path region of the terrain.

It may be that the dissimilarity criteria comprise one or more conditions relating to the tyre region image content data and the global non-path GMM. For example, it may be that the dissimilarity criteria comprise one or more colour and/or texture conditions that a colour and/or texture distribution of the tyre region image content data relating to a respective sub-region does not match the distribution of the global non-path GMM to a given degree.

At 518, path and non-path probability data determined during 508*a*-516*a* and 508*b*-516*b* are combined to provide a final path probability map. The final path probability map may be determined as a weighted combination of the path probability map and a secondary path probability map inferred from the non-path probability data. The secondary path probability map may be an inverse of the non-path probability map determined by inferring that the sub-regions which have low non-path probabilities have high path probabilities. For example, it may be that the camera system 185C is configured to infer the secondary path probability, $P_{secondary\_path\_i}$, for a respective $i^{th}$ sub-region from the non-path probability, $P_{non-path\_i}$, based on: $P_{secondary\_path\_i} = 1 - P_{non-path\_i}$. Alternatively, the path and non-path probability data may be combined in any other suitable way to determine the final probability map. For example, the probabilities determined at 514*a*, 514*b* may be combined, for example by subtracting the non-path probability from the path probability to provide a final path probability for each sub-region. It may be that the probabilities from the path probability map are allocated a more significant weighting than the inferred probabilities from the secondary path probability map to reflect a greater confidence in those values. Alternatively it may be that the same weights are applied to each, or indeed greater weight may be allocated to the inferred probabilities from the secondary path probability map. It may be that respective weights to be applied to the path and non-path probability data are determined in dependence on the respective consistencies of one or more path/non-path boundaries determined from the path and non-path probability data respectively. Ways in which the respective consistencies of path boundaries can be measured are explained in more detail below. By inferring secondary probability data from the non-path probability data and combining the secondary path probability data with the path probability data, a more confident determination can be made as to whether a portion of the terrain is a path or non-path region of the terrain.

When the final path probability map is determined, it may be merged with a global final path probability map determined from previous frames of image data captured by the stereoscopic camera system 185C.

Figure 9:
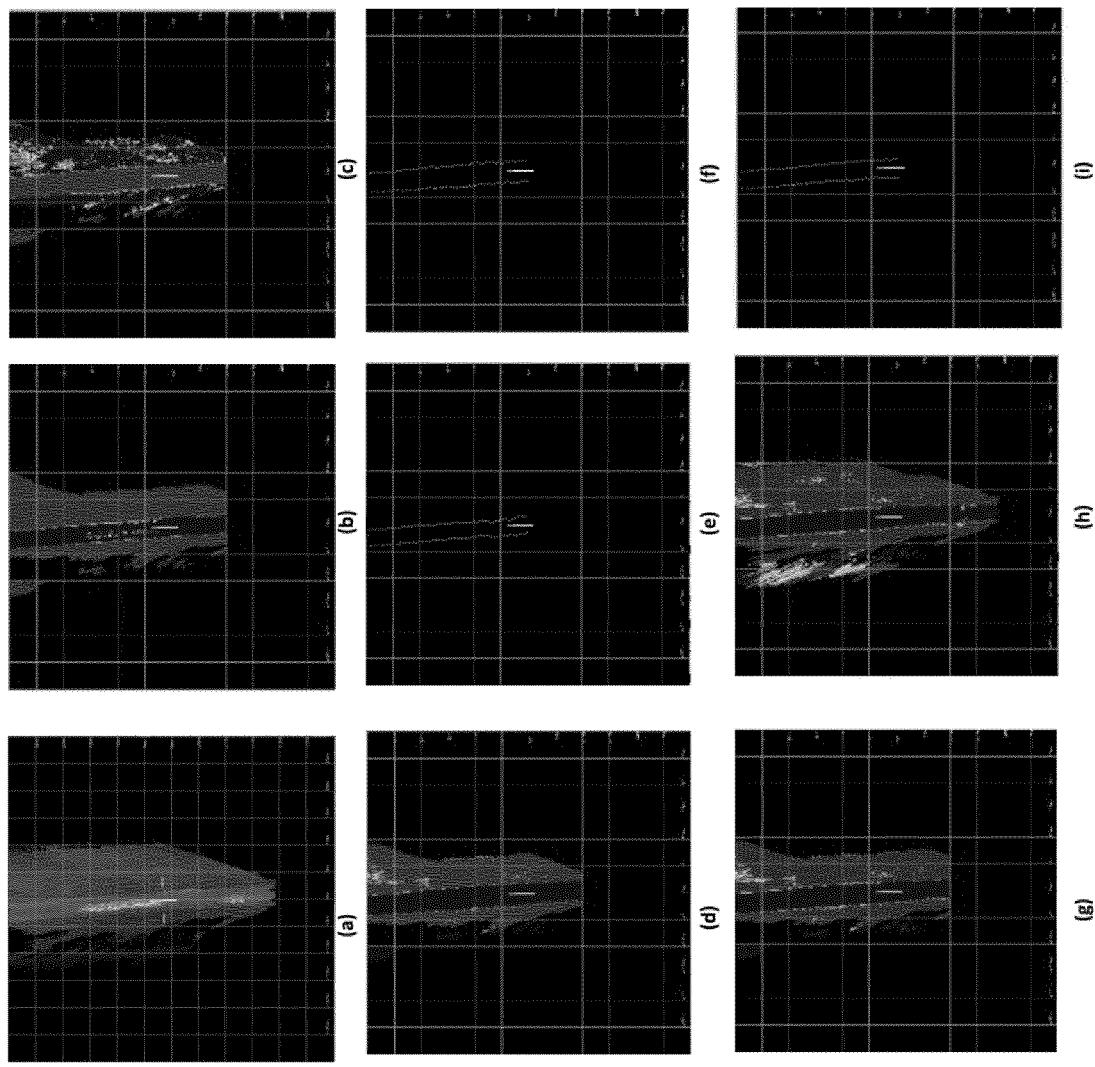
FIG. 9a shows, in plan view, the pixels of the RGB image of FIG. 8a overlaid on a 3D grid obtained based on the disparity image of FIG. 8b (i.e.
FIG. 9b is a path probability map derived from the image of FIG. 9a with each pixel classified by reference to a path model.
FIG. 9c shows, in plan view, a non-path probability map derived from the image of FIG. 9a with each pixel classified using a non-path model.
FIG. 9d illustrates the inverse of the non-path probability map.
FIG. 9e and FIG. 9f show the path and non-path boundaries derived from the path and non-path probability maps.
FIG. 9g shows the final path probability map obtained from a weighted combination of the path probability map and the inverse of the non-path probability map.
FIG. 9h shows the final path probability map of FIG. 9g merged with a global path probability map stored in a memory.

The method of FIG. 5 will now be illustrated with reference to the example of FIGS. 8-9.

FIG. 8a shows a first 2D image obtained by a first image sensor of the stereoscopic camera system 185C of terrain ahead of the vehicle 100. The terrain comprises a paved path region 700 and a pair of grass non-path regions 702, 704 on either side of the paved path region 700. FIG. 8b shows the disparity image between the first 2D image shown in FIG. 8a and a second 2D image obtained by a second image sensor of the stereoscopic camera system 185C. FIG. 8c shows the pixels of the image of FIG. 8a overlaid on a 3D grid obtained based on the disparity image of FIG. 8b and mapped relative to a horizontal plane. Also shown in FIG. 8c is a white line 708 showing the location of the longitudinal axis of the vehicle 100 on the path 700, the locations 706a-706d of the tyres of the vehicle 100 and the locations 707a, 707b of the non-path regions of the terrain laterally offset from the vehicle used to determine the non-path model.

FIG. 9a repeats the view of FIG. 8c for reference. FIG. 9b shows the path probability map determined at 516a of the method of FIG. 5 with respect to the terrain of FIG. 9a. The shading of the path probability map varies from black to grey, with black indicating a higher probability that the sub-region relates to the path region of the terrain and grey indicating a lower probability thereof. The majority of the path region 700 is correctly identified as being a path region of the terrain, and the majority of the non-path regions 702, 704 are correctly identified as not being a path region of the terrain. However, at the edges of the path region, and some portions near the centre of the path region, there are sub-regions which have not been correctly identified as being a path region. This may be at least partly because, as can be seen from FIG. 8a for example, some portions of the path region 700, such as the puddle regions 705 covered with water, have image contents (e.g. colour and/or textures) which will not accurately match the global path GMM.

Figure 5:
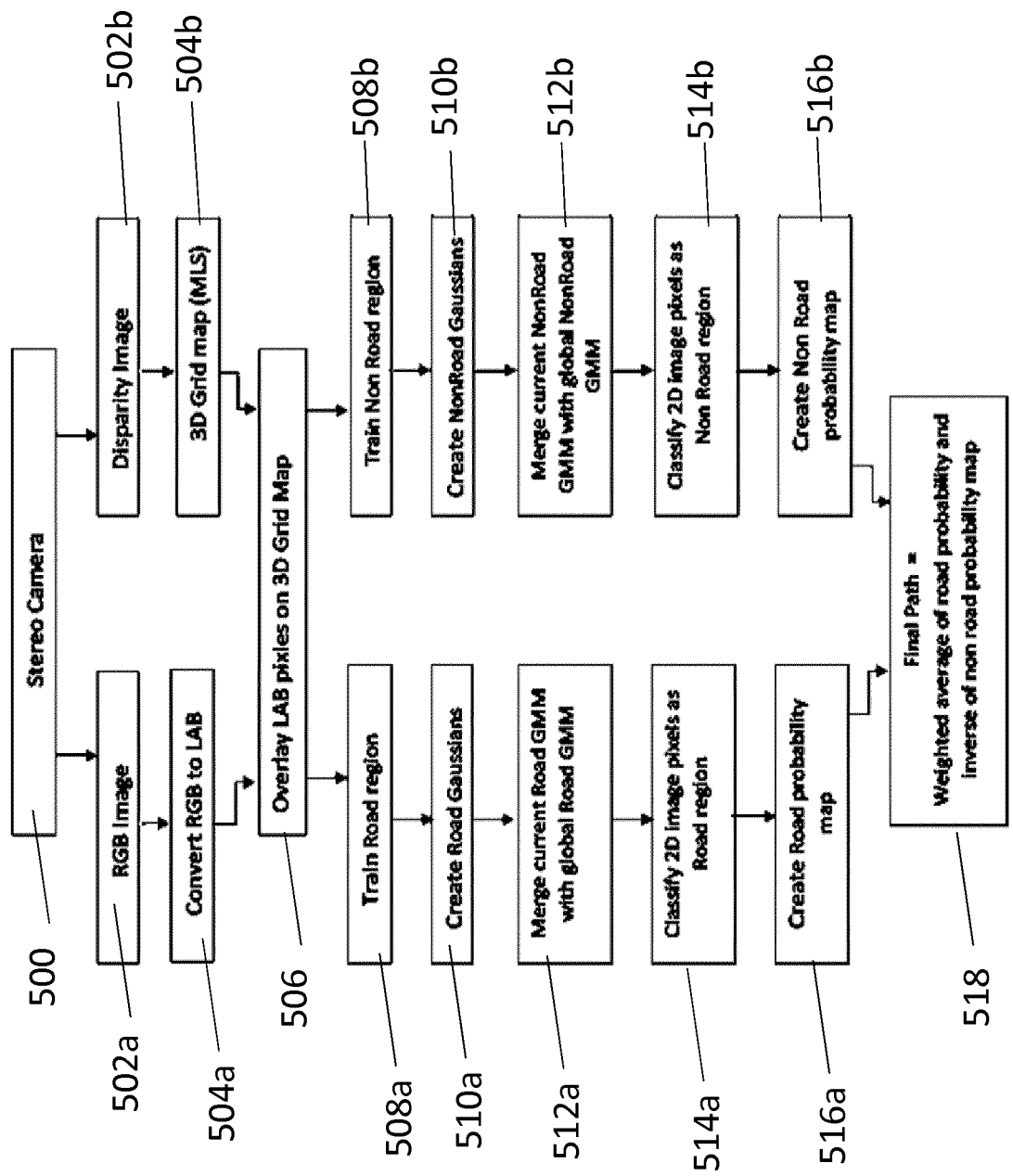
FIG. 5 is a flow chart illustrating operation of a control system of the vehicle of FIGS. 1, 2.

FIG. 9c shows the non-path probability map determined at 516b of the method of FIG. 5. The colour varies from black to grey, with black indicating a higher probability that the sub-region relates to the non-path region of the terrain and grey indicating a lower probability thereof. The majority of the path region 700 is correctly identified as not being a non-path portion of the terrain, and the majority of the non-path regions are correctly identified as being non-path portions of the terrain. Indeed, there is no distinction made in the non-path probability map between the dry and puddle regions of the path 700. However, at the edges of the non-path region, and some portions further to the left and right of the non-path region, there are sub-regions which have not been identified as being non-path with a high probability. This may be because they do not match the global non-path GMM.

FIG. 9d shows a secondary path probability map inferred from the non-path probability map of FIG. 9c by the stereoscopic camera system 185C determining the inverse of the non-path probability map of FIG. 9c at 518. Again the colour varies from black to grey, with black indicating a higher probability that the sub-region relates to the path region of the terrain and grey indicating a lower probability thereof. It can be seen that the centre of the path region is determined to relate to the path region of the terrain with a greater probability in the secondary path probability map than in the path probability map of FIG. 9b. This is at least in part because there is no distinction made between the dry and puddle regions of the path 700 of the terrain in the secondary path probability map. In addition, some of the sub-regions at the boundaries between the path region and the non-path region are determined to relate to path or non-path regions of the terrain with higher probability than in the path probability map of FIG. 9b.

FIGS. 9e and 9f show the path and non-path boundaries respectively determined from the path and non-path probability maps of FIGS. 9b and 9c respectively. It can be seen, particularly in the right hand path boundary of FIG. 9e near the location of the vehicle 100, that a consistent boundary is not determined from the path probability data of FIG. 9b alone.

FIG. 9g shows the final path probability map determined by a weighted combination of the path probability map and the secondary path probability map inferred from the non-path probability map. It can be seen that the sub-regions of the image data are determined to be path or non-path with a higher degree of confidence in the final path probability map that from any of the path probability map determined at 516a (FIG. 9b), the non-path probability map determined at 516b (FIG. 9c) or the secondary path probability map inferred from the non-probability map at 518 (FIG. 9d). FIG. 9h shows the final path probability map merged with the global path probability map. FIG. 9i shows the path boundary determined from the updated global path probability map of FIG. 9h. It can be seen that the path boundary of FIG. 9i is more consistent than the path boundary of FIG. 9e or the non-path boundary of FIG. 9f.

Thus, the method of FIG. 5, in which both path and non-path probabilities are determined, provides more confident determination of path and non-path regions of the terrain than is achievable with either the path or non-path probabilities alone.

Figure 7B:
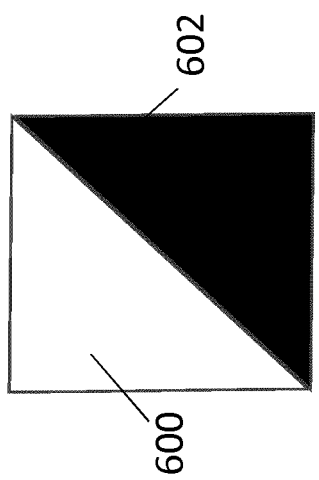
FIGS. 7a and 7b show sub-regions of image data having a first portion relating to a path region of the terrain and a second portion relating to a non-path region of the terrain.
Figure 7A:
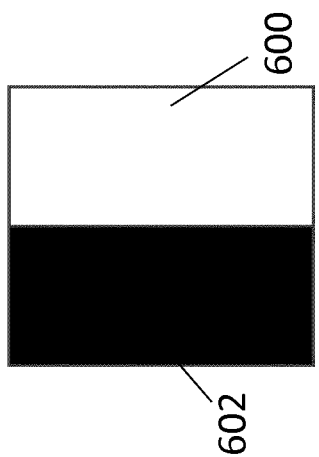

It will be understood that occasionally part of one or more tyres of the vehicle 100 may leave the path region of the terrain and enter a non-path region of the terrain. In this case, it may be that a first part of the tyre region image data relates to the path region, while a second part of the tyre region image data relates to the non-path region. This is illustrated in FIGS. 7a and 7b, which show sub-regions of the image data comprising path portions 600 and non-path portions 602. Accordingly, in the event that tyre region image content data relating to a tyre of the vehicle is determined not to match the tyre region image content data relating to the other tyres of the vehicle or the global path GMM, it may be that the stereoscopic camera system 185C is configured to split the sub-region of the image data from which the tyre region image content data is derived into two or more portions. In this case, image content data derived from a (or each) selected portion of the sub-region (rather than from the entire sub-region) may be compared to any one or more of: the tyre region image content data relating to the other tyres; the global path GMM; the global non-path GMM. If the image content data derived from the selected portion of the sub-region meets the one or more similarity criteria with respect to one or more of the other tyres and/or the global path GMM, it may be that the camera system 185C selectively merges the image content data derived from that selected portion of the sub-region with the global path GMM. For example, the similarity criteria may require that the selected portion of the sub-region is more strongly correlated with the global path GMM than the global non-path GMM and/or is more strongly correlated with the global path GMM than another portion of the sub-region and/or is sufficiently strongly correlated with the global path GMM. Otherwise, it may be that the camera system 185C decides not to merge the image content data derived from that selected portion of the sub-region with the global path GMM. It may be that this helps the global path GMM to become more generalised more quickly, thereby helping to improve the accuracy of the path probability data.

As will be explained below, the VCU 10 may determine cost data in dependence on the path and non-path probabilities, and determine a future path for the vehicle in dependence on the cost data, typically by determining a cost map based on the cost data. The cost map may comprise a grid of cells. The way in which the image data relating to a sub-region is split may depend on the direction of the determined path relative to the cost map grid. For example, if the path is parallel to an axis of the grid, it may be that the image data is split into left and right portions. For example, FIG. 7a shows the path region 600 on the right hand side with the non-path region 602 on the left hand side for a path travelling north/south (parallel to the vertical axis). In another example (see FIG. 7b), the path is diagonal to the grid and the image data may be split diagonally in the cell.

The stereoscopic camera system 185C may determine a cost map relating to the terrain based on the path and non-path probabilities, for example in dependence on the final path probability map. In order to determine the cost map, the stereoscopic camera system 185C may determine, for each of the sub-regions of the image data, a cost for the vehicle 100 to traverse the respective portion of the terrain to which the sub-region relates in dependence on the path and non-path probabilities determined from 508-518, for example in dependence on the final path probability relating to that sub-region determined at 518. The cost may relate to a penalty or a reward associated with the respective portion of the terrain. An increased cost may relate to an increased penalty or a reduced reward. Similarly a reduced cost may relate to a reduced penalty or an increased reward. However, it will be assumed in the following description that the cost is allocated on a penalty basis.

In an example, for each sub-region, the greater the final path probability, the lower the cost allocated to that sub-region and the lower the final path probability, the greater the cost allocated to that sub-region. It may be that the costs are allocated to sub-regions on a binary basis, for example a low cost for sub-regions having final path probabilities greater than a threshold and a high cost for sub-regions having final path probabilities lower than a threshold. However, it may be that costs are allocated on a more granular basis. For example, it may be that the cost for the vehicle to traverse a portion of the terrain to which the sub-region relates is determined depending on the final path probability meeting one or more path probability criteria indicating that the sub-region relates to the path region, one or more non-path probability criteria indicating that the sub-region relates to the non-path region or neither the path probability criteria nor the non-path probability criteria.

Sub-regions having low path probabilities determined at 514a and low non-path probabilities determined at 514b may have an intermediate final path probability between a relatively low final path probability and a relatively high final path probability. For example, it may be that puddle regions 705 of the path region 700 of the example of FIG. 8a are provided with intermediate final path probabilities because they do not meet one or more similarity criteria with respect to either the global path or global non-path GMM. In this case, a first, relatively high cost may be allocated to sub-regions having a relatively low final path probability, a second, intermediate cost may be allocated to sub-regions having an intermediate final path probability and a third, relatively low cost may be allocated to sub-regions having relatively high final path probabilities. In this way, an at least three-tiered cost allocation scheme may be implemented in which the final path probabilities are probability parameters relating to whether the respective sub-regions relate to the path region or the non-path region. If the final path probability associated with a sub-region meets path probability criteria, in this case that the final path probability is greater than a respective path threshold, a low cost may be allocated to that sub-region. If the final path probability associated with a sub-region meets non-path probability criteria, in this case that the final path probability is less than a respective non-path threshold (which may be different from the path threshold), a high cost may be allocated to that sub-region. If the final path probability associated with a sub-region meets neither the path nor the non-path probability criteria (e.g. the final path probability is between the path and non-path thresholds), it may be that an intermediate cost is allocated to that sub-region.

Figure 10:
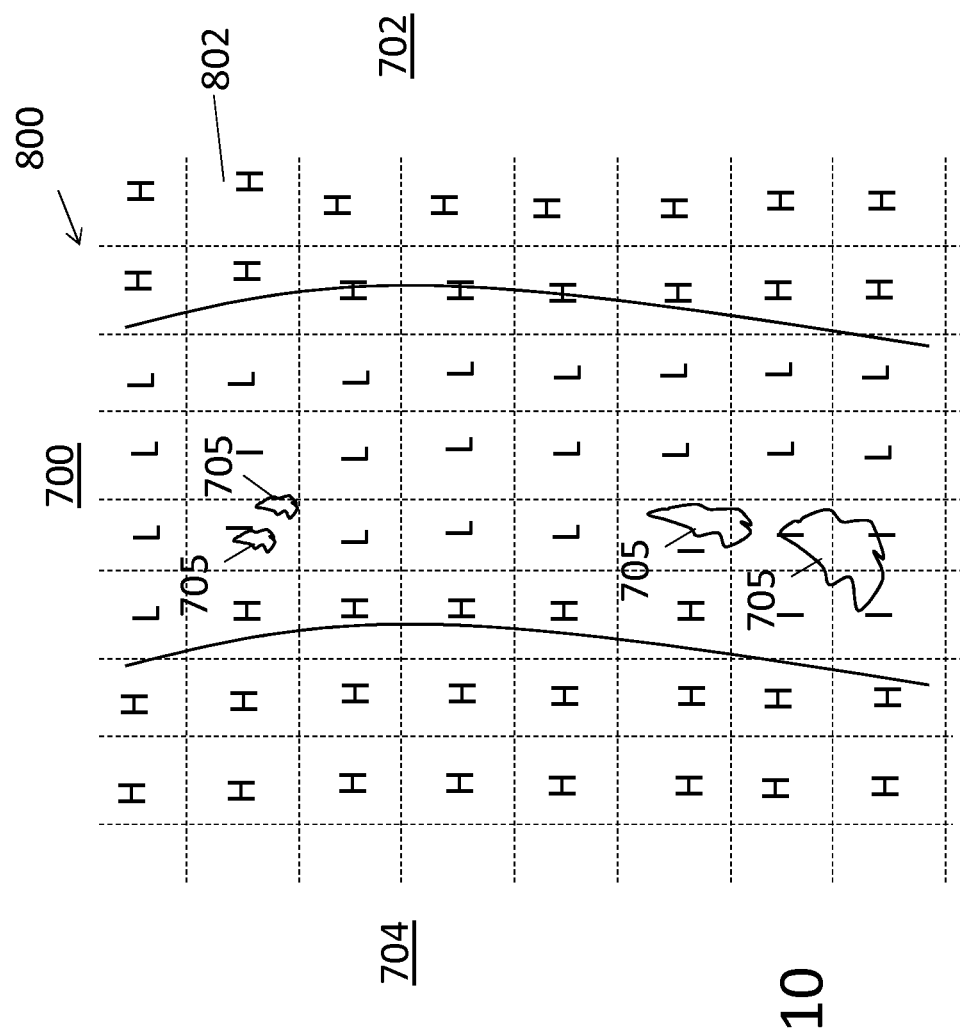
FIG. 10 is a close up schematic view of the terrain of FIG. 9a together with a cost map overlaid thereon.

This is illustrated in FIG. 10 which schematically shows an example terrain based on the terrain of FIG. 8a with a cost map 800 determined using a three-tiered cost allocation scheme overlaid thereon, the cost map 800 comprising a plurality of cells 802 each of which relates to a sub-region of the image data. The letter L indicates that a relatively low cost has been allocated to the sub-region, the letter H indicates that a relatively high cost has been allocated to the sub-region, while the letter I indicates that an intermediate cost has been allocated to the sub-region. For ease of illustration, the cells 802 of the cost map 800 of FIG. 10 are larger than would normally be used in practice.

In other examples, it may be that costs are allocated to each sub-region from a (e.g. continuous) scale having more than three possible costs in dependence on the final path probability determined for that sub-region. In this case, because there are more than three possible costs which can be allocated to a sub-region, it may still be considered that the cost for the vehicle to traverse a portion of the terrain to which the sub-region relates is determined depending on the final path probability for that sub-region meeting one or more path probability criteria indicating that the sub-region relates to the path region, one or more non-path probability criteria indicating that the sub-region relates to the non-path region or neither the path probability criteria nor the non-path probability criteria. For example, in this case, there may be at least three sub-regions, at least a first of which has a relatively high final path probability such that it is allocated a relatively low cost, at least a second of which has a relatively low final path probability such that it is allocated a relatively high cost, and at least a third of which has an intermediate path probability such that it is allocated an intermediate cost intermediate the relatively high and relatively low costs. In this case, it may be said that the final probability of the first sub-region implicitly meets one or more path probability criteria, the final probability of the second sub-region implicitly meets one or more non-path probability criteria and the final probability of the third sub-region implicitly meets neither the path nor non-path probability criteria. It will be understood that the scale of costs may be infinitely variable. It may be that the relationship between the costs allocated and the final path probabilities of the respective sub-regions is not linear. For example, exponentially greater costs may be allocated to respective cells relating to sub-regions for which there is a high probability that it relates to a non-path region.

Cost may (for example) alternatively be allocated directly in dependence on the path and non-path probabilities. Any suitable alternative cost allocation strategy may be employed.

Figure 11:
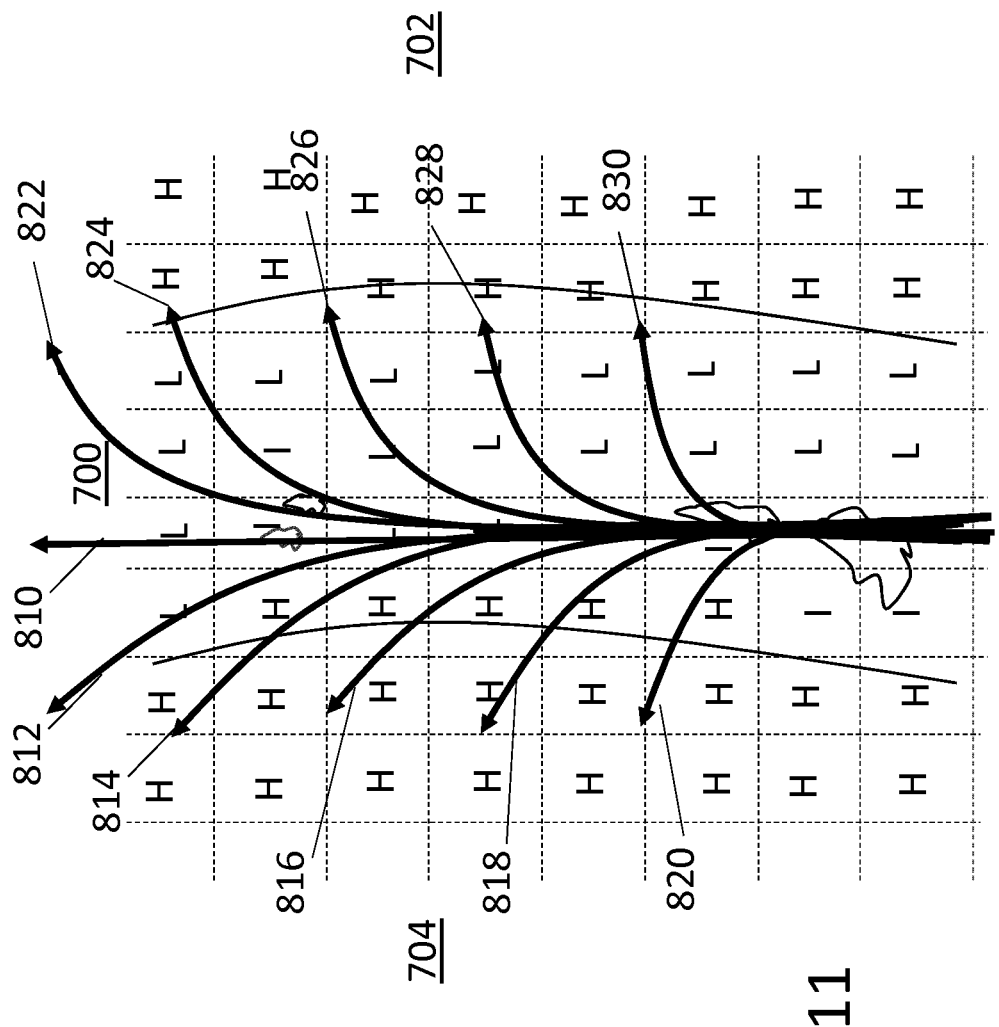
FIG. 11 shows the view and cost map of FIG. 10 with a plurality of candidate trajectories overlaid thereon.

The cost map may be transmitted from the stereoscopic camera system 185C to the VCU 10 which may determine a future path for the vehicle in dependence on the cost map. The cost data of the cost map may be provided by the stereoscopic camera system 185C to the VCU 10 on a cell by cell basis. Optionally, the VCU 10 merges the cost map with an existing global cost map which may be based (at least in part) on cost maps obtained previously from the stereoscopic camera system 185C. In order to determine a future path for the vehicle 100, costs for the vehicle to traverse the terrain by each of a plurality of candidate trajectories may be calculated from the cost map 800 (or from a global cost map into which cost map 800 is merged) and a preferred path may be selected from the candidate trajectories in dependence on the calculated costs. This is illustrated in FIG. 11, which shows the same terrain and cost map 800 as FIG. 10 with a plurality of candidate trajectories 810-830 overlaid thereon. If it is assumed that the VCU 10 will want to avoid high cost regions of the terrain, then the VCU 10 may select trajectory 810 as its preferred path as it will have the lowest cost. Following trajectory 810 would cause the vehicle 100 to traverse regions of the terrain which have been allocated intermediate (I) costs by the cost map 800. This is made possible by using an at least three-tiered cost allocation scheme to determine the cost map 800. It will be understood that, if a binary cost allocation scheme was employed, it may be that the puddle regions 705 of the terrain would have been allocated a high cost, in which case it may be that the VCU 10 would attempt to guide the vehicle around the puddle regions rather than through them. Thus, a more optimal (direct) vehicle path may be achieved by the cost map 800 having at least three different costs allocated to different sub-regions of the image data.

Figure 12:
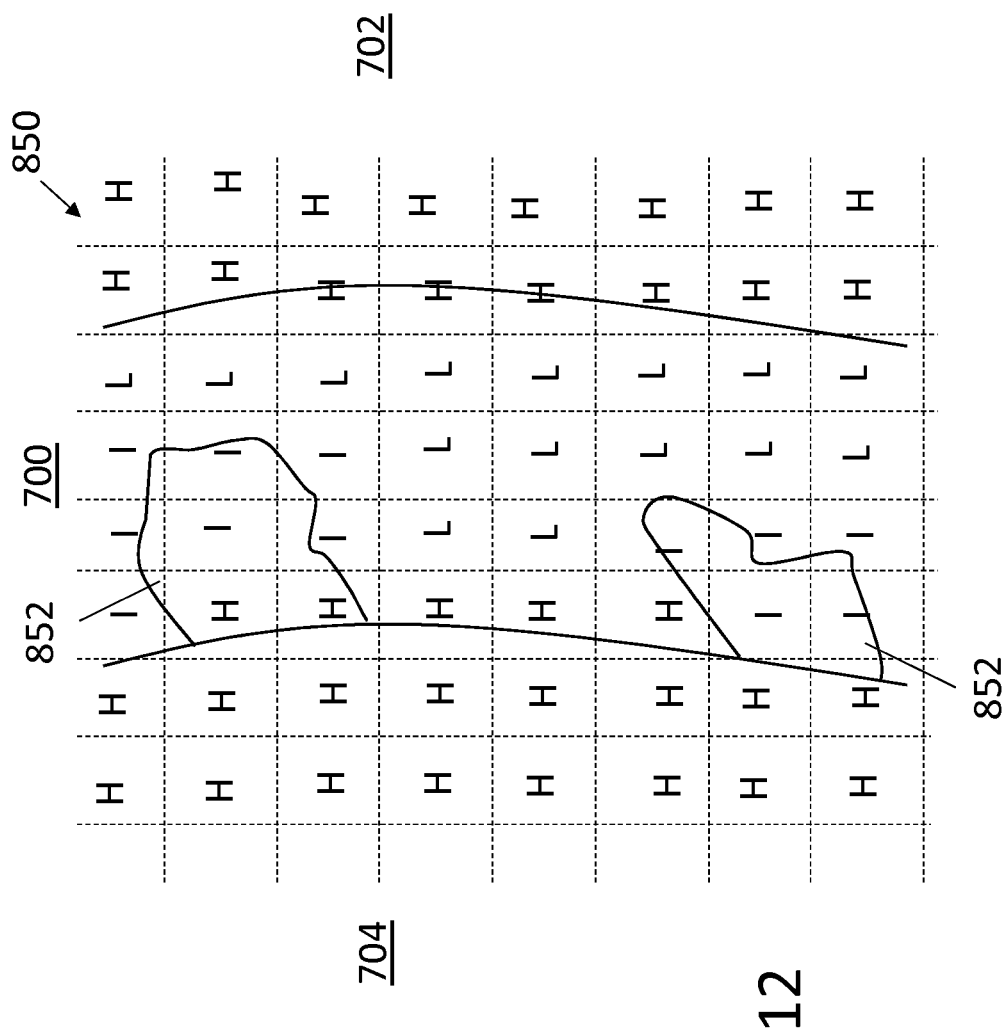
FIG. 12 is a similar view to FIG. 10 but showing shadow regions on the terrain in place of the puddle regions of FIG. 10.

Although the intermediate cost cells have been illustrated as portions of the path 700 covered by puddles of water, it will be understood that intermediate cost cells may additionally or alternatively be portions of the path 700 covered by shadows, e.g. of trees or bushes on either side of the path 700 or any other cause of variable lighting on the path 700. This is illustrated by the cost map 850 shown in FIG. 12 relating to a similar terrain as the cost map of FIG. 10 but with shadow portions 852 rather than puddle portions 705. Again, by allocating an intermediate cost to the shadow portions 852, it may be that the vehicle path determined by the VCU 10 passes through one or more of the shadow portions 852, which may allow a more optimal path to be determined.

It will be understood that, instead of calculating the cost for each of a plurality of candidate trajectories and selecting a preferred path from the candidate trajectories in dependence on the costs, it may be that the future path is determined by analysing the cost map in order to determine the lowest cost route. While this may allow a more optimal route to be determined, it is more processing intensive.

In the case that the cost map 800 is merged with an existing global cost map based on previously obtained cost data, it may not be necessary to determine costs based on image data common to previous frames of image data captured at different times and/or locations of the vehicle. Rather, it may be that cost data is determined only for image data relating to portions of the terrain for which cost data was not determined based on previous frames of image data. This helps to reduce the quantity of processing required.

It will be understood that it is not essential to obtain both path and non-path probabilities in order to be able to allocate an at least three-tiered cost allocation scheme to a cost map. For example, a three-tiered cost allocation scheme may be based on path probabilities determined with reference to a texture-based global path GMM (e.g. which uses texture or colour and texture as the modelled parameter). In this case, it may be that regions of the path 700 under variable lighting conditions (e.g. having reflective puddles, shadow regions etc) may be identified as having a texture which is more similar to the other portions of the path 700 than to the non-path region on either side of the path (which may be grass and have a more distinctive texture). Additionally or alternatively, it may be determined that a shadow region of the path 700 has a more similar colour content to other portions of the path 700 than the (e.g. grassy) non-path regions 702, 704 of the terrain. In either case, intermediate costs can be allocated to portions of the path 700 under variable lighting conditions, and low and high costs to portions of the terrain confidently identified as path and non-path regions respectively.

It may be that the cost map 800 or 850 (and/or the global cost map with which the cost map 800 or 850 is merged) is a wheel cost map indicative of costs for the wheels of the vehicle 100 to traverse the terrain independently of the body of the vehicle 100. Although the candidate trajectories in FIG. 11 are each represented by single lines 810-830, it will be understood that different wheels of the vehicle 100 may follow different paths from each other for a given vehicle trajectory 810-830. Accordingly, it may be that the cost associated with each of the candidate trajectories 810-830 takes into account the different paths which would be followed by each of the wheels if the vehicle 100 were to follow that trajectory 810-830. For example, the cost of the vehicle 100 traversing the terrain by way of each candidate trajectory 810-830 may be determined by determining the costs for each of the wheels of the vehicle 100 to follow their respective paths along that trajectory. Alternatively, it may be that the cost of the vehicle 100 traversing the terrain by way of each candidate trajectory 810-830 may be determined by selectively determining the costs for diagonally opposite wheels of the vehicle 100, such as for the front right and rear left or front left and rear right wheels of the vehicle, to follow their respective paths along that trajectory. In this case, it may be that the cost associated with each candidate trajectory is the average or the sum of the costs for the respective wheels to follow their respective paths along that trajectory.

Although the costs associated with the cells 802 of the wheel cost map 800 are described above as relating to whether they relate to path or non-path regions of the terrain, the costs associated with each of the cells 802 of the wheel cost map may additionally or alternatively relate to any one or more of: a gradient of the terrain in a projected direction of travel of the vehicle; a side slope of the terrain transverse to a projected direction of travel of the vehicle. The gradient of the terrain in the projected direction of travel and/or the side slope of the terrain may be determined from topography information relating to the terrain determined from the 3D grid map onto which the image data is overlaid. Alternatively, the gradient of the terrain in the projected direction of travel and/or the side slope of the terrain may be determined from a ranging system of the vehicle such as a radar-based terrain ranging system, a laser-based terrain ranging (e.g. LIDAR) system or an acoustic ranging system of the vehicle 100 or from a gradient sensor of the vehicle (if provided).

The projected direction of travel may be determined from the candidate trajectory of the vehicle 100.

It may be that the costs associated with the cells 802 of the wheel cost map 800 are generalised costs substantially independent of the direction of travel of the vehicle 100 across the respective cells 802. Alternatively, a plurality of wheel cost maps 800 may be determined, each being associated with a respective candidate trajectory across the terrain. In the latter case, the costs associated with the cells 802 of the wheel cost map 800 may be dependent on the direction of travel of the candidate trajectory with which it is associated across the terrain. This provides the cost data with increased accuracy, but involves increased processing as compared to the former case.

The preferred path selected from the wheel cost map(s) 800 may be based on non-obstacle cost data, and/or it may be that the preferred path selected from the wheel cost map(s) does not take into account some obstacles of the terrain. Accordingly, it may be that the VCU 10 is configured to obtain further cost data relating to the cost of traversing the terrain to check, for example, whether the selected preferred path contains any obstacles which would render it unsuitable for the vehicle 100. For example, it may be that the stereoscopic camera system 185C is configured to determine a second, body cost map indicative of respective cost(s) for a swept volume of the body of the vehicle 100 to traverse one or more portions of the terrain independently of the wheels of the vehicle 100. The stereoscopic camera system 185C may then be configured to transmit the second, body cost map to the VCU 10 which may take it into account to determine the future path for the vehicle 100. The cells of the body cost map may correspond to (e.g. are aligned with in relation to the terrain) the respective cells of the wheel cost map(s) 800.

The second, body cost map may be based on the 3D grid data generated by the stereoscopic camera system 185C in respect of the terrain. The body cost map may include cost data relating to one or more obstacles of the terrain, such as one or more three-dimensional, 3D, obstacles of the terrain. The body cost map may also include cost data relating to one or more objects (e.g. branches, bushes) overhanging a ground level (e.g. a path region on a ground level) of the terrain. It may be that the body of the vehicle 100 has a predetermined minimum elevation with respect to the ground level of the terrain. It may be that the body cost map is selectively based on 3D grid data relating to objects or obstacles having elevations which exceed the predetermined minimum elevation. Similarly, it may be that the body of the vehicle 100 has a predetermined maximum elevation with respect to the ground level of the terrain. It may be that the body cost map is selectively based on 3D grid data relating to objects or obstacles having elevations which are below the predetermined maximum elevation. This advantageously allows the body cost map to account for whether or not the body of the vehicle 100 would engage or clear the obstacle or overhanging object if the vehicle 100 were to traverse the terrain across a particular candidate trajectory.

It may be that the stereoscopic camera system 185C determines from the 3D grid data whether the portion of the terrain to which each respective sub-region relates comprises any features having an elevation greater than the minimum elevation and less than the maximum elevation, which may be an indication that the body of the vehicle 100 would be impeded if it was to try to traverse that portion of the terrain. If so, it may be that the stereoscopic camera system 185C determines that there are obstacles present in the portion of the terrain to which that sub-region relates. If not, it may be that the stereoscopic camera system 185C determines that there are no obstacles present in the portion of the terrain to which that sub-region relates. If there are one or more obstacles, it may be that the stereoscopic camera system 185C allocates a relatively high cost to that sub-region. If there are no obstacles, it may be that the stereoscopic camera system 185C allocates a relatively low cost to that sub-region. The cost data in the body cost map may be binary (e.g. relating to whether the cell to which it relates is passable or impassible by the vehicle) such that the body cost map is in effect an occupancy grid. Alternatively, it may be that the cost data in the body cost map is more granular. For example, costs may be allocated to cells of the body cost map using an at least three-tiered cost allocation scheme.

Figure 13:
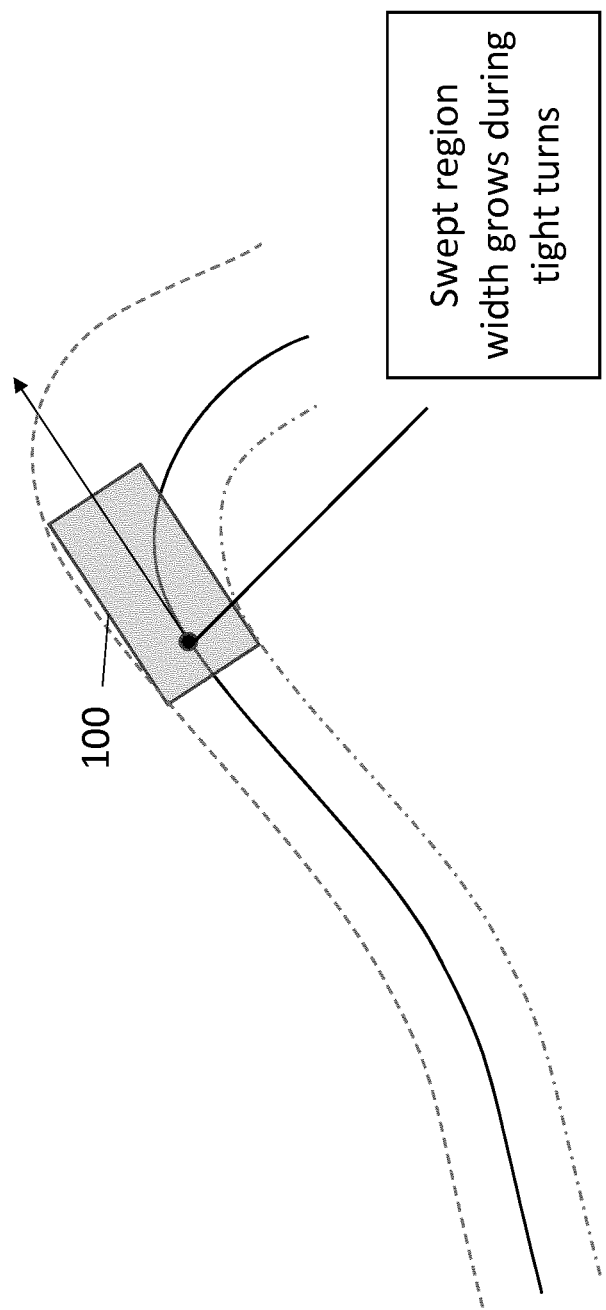
FIG. 13 shows the volume swept by the vehicle of FIGS. 1 and 2 increasing during tight turns.

While the cost for the vehicle 100 to traverse the terrain based on the wheel cost map may involve the determination of the costs for different wheels of the vehicle 100 to traverse different paths along the various candidate trajectories 810-830 (and optionally summing or averaging those costs), it may be that determining the cost for the vehicle 100 to traverse the terrain based on the body cost map involves determining which cells of the body cost map would be occupied by a volume swept by the body of the vehicle 100 if it were to traverse the terrain by a particular trajectory. In this case, it may be that the stereoscopic camera system 185C determines the swept volume of the vehicle 100 with respect to each candidate trajectory, and determines the cost for the body of the vehicle 100 to traverse the terrain by that trajectory by for example summing the costs associated with the cells which would be occupied by the swept volume of the vehicle 100 following that trajectory. As illustrated in FIG. 13, the volume swept by the body of the vehicle 100 along a trajectory depends on the curvature of the path followed by the vehicle 100, increasing for tighter turns and decreasing for gentler turns. Thus, it may be that the stereoscopic camera system 185C is configured to determine the volume swept by the body of the vehicle 100 along a trajectory in dependence on the curvature of that trajectory, and to determine the cost associated with that trajectory in dependence on the swept volume and the body cost map.

It may be that the body cost map is transmitted by the stereoscopic camera system 185C together with the wheel cost map to the VCU 10, and it may be that the VCU 10 merges the body cost map with a global body cost map based on previous frames of image data. It may be that the VCU 10 selects a preferred path based on the wheel cost map 800 as described above, before determining the cost for a swept volume of the body of the vehicle 100 to traverse the selected preferred path based on the body cost map. If the cost derived from the body cost map is too high (e.g. above a threshold indicative that the path contains one or more impassible obstacles), it may be that the VCU 10 selects an alternative preferred path (e.g. from the candidate trajectories shown in FIG. 11 based on the wheel cost map 800) and determines whether that path comprises obstacles based on the body cost map. This process may be repeated until a path is found which does not contain obstacles which are impassible by the body of the vehicle 100.

By providing separate wheel and body cost maps, the different effects of the terrain on the wheels and body of the vehicle 100 can be accounted for, enabling more accurate costs to be determined for the vehicle 100 to traverse respective candidate trajectories across the terrain, allowing a more optimal vehicle path to be determined (e.g. as compared to providing a single cost map which does not separate wheel and body cost data). For example, it may be that one or more portions of the terrain, such as a strip of grass extending between a pair of substantially parallel ruts or tracks, would incur a relatively high cost for the wheels of the vehicle to traverse but a relatively low cost for the body to traverse (e.g. because a minimum elevation of the body is greater than a maximum elevation of the said portion of the terrain such that the vehicle body would clear the said portion of the terrain). By providing separate wheel and body cost maps, a (potentially optimal) vehicle path which provides the wheels of the vehicle in the ruts/tracks and the body of the vehicle over the grass strip may be determined to have a relatively low overall cost. Conversely, a cost map which does not separate body and wheel effects may determine that such a path would be of a relatively high overall cost. Thus, providing separate wheel and body cost maps is particularly advantageous.

Figure 14:
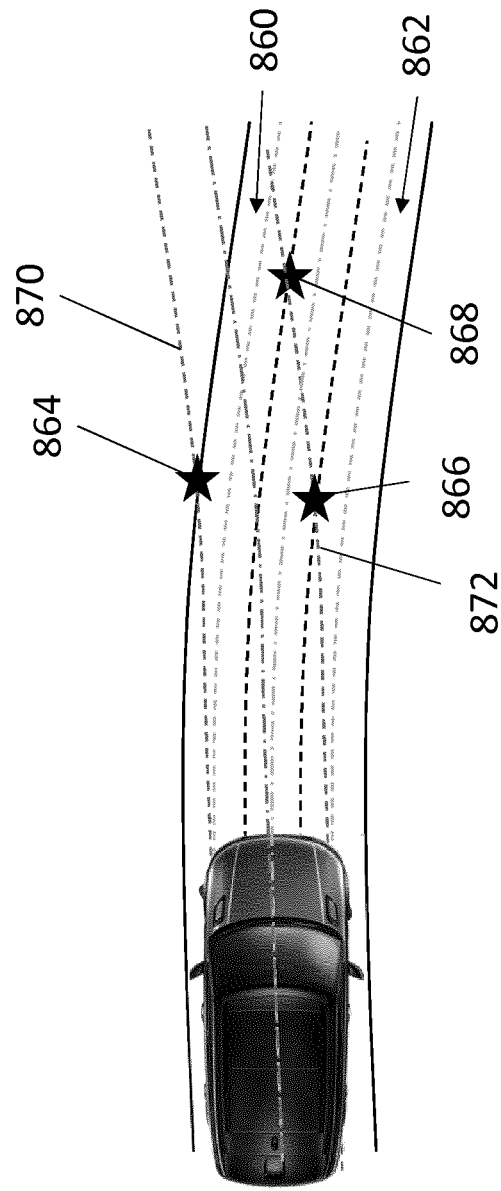
FIG. 14 shows the vehicle of FIGS. 1 and 2 following mud ruts.

In some terrains, there are features which are of low cost for a vehicle to traverse in one direction, but which are of high cost for the vehicle to traverse in other directions. For example, mud ruts typically comprise tracks for wheels of the vehicle which are of low cost for the vehicle to follow, but which are of high cost for the vehicle to cross. This is illustrated in FIG. 14 which shows the wheels of vehicle 100 following mud ruts 860, 862. Stars 864, 866, 868 represent locations of the mud ruts 860, 862 which would be crossed by the vehicle 100 if it were to follow the path defined by lines 870, 872. This directional dependency on cost cannot be accommodated by traditional cost maps or occupancy grids, which typically allocate a cost to a particular portion of the terrain which is applied independently of the direction of travel of the vehicle.

Accordingly, it may be that the stereoscopic camera system 185C (or any other processing system of the vehicle 100 in data communication with the stereoscopic camera system 185C such as the VCU 10) is configured to determine a third, line features cost data structure in dependence on which the future path for the vehicle 100 may be determined. The line features cost data structure typically comprises a plurality of line features, which may each be represented by a plurality of location points defining the line feature or a best fit line (for example), the line features indicating lines of the terrain which should not be crossed by the vehicle. The line features cost data structure may also comprise direction data indicative of a crossing direction of the line features, although this may be implicit in the shape of the line feature in which case it may not be necessary to store direction data in the line features cost data structure. In one example, the stereoscopic camera system 185C may be configured to determine line features based on the path boundaries derived from the path and non-path probability data described above (e.g. from the final path probability data).

It may be that the camera system 185C (or other processing system of the vehicle such as VCU 10) is configured to determine boundaries between path and non-path regions of the terrain based on the path probability data and the non-path probability data. For example, it may be that first and second (e.g. left and right) boundary lines between the path and non-path regions of the terrain are identified independently from each of path probability data and the non-path probability data. It may be that the boundary lines determined from the non-path probability data are determined from the secondary path probability data. For each boundary pair, the path width (i.e. shortest distance between the boundaries of the said pair) may determined for each of a plurality of locations along the path. A consistency measure may be determined for each said boundary pair in dependence on any one or more of: the average (e.g. mean) of the said path widths of the boundary pair; the standard deviation of the path widths between the boundaries of the boundary pair; the lengths of the boundaries. Respective first and second weights may then be determined for the path and non-path boundary pairs respectively in dependence on the consistency measures of the boundaries determined from the path and non-path probability data respectively. The boundaries obtained from the path and non-path probability data may be combined in dependence on the first and second weights. For example, the camera system 185C (or other processing system of the vehicle such as VCU 10) may put more emphasis on one of the path and non-path boundaries if they have been allocated more significant weight than the other by virtue of being more consistent than the other. The boundaries determined from the combination of the boundaries determined from the path and non-path probability data may provide line features. The crossing direction for each line feature may be determined based on the direction in which the terrain changes from a path region to a non-path region in the path and non-path probability data (or in the final path probability data). The line features act as boundaries across which the vehicle path should not cross. It may be that the line features cost data structure is merged with a global line features cost data structure based on line features cost data structures derived from previous frames of image data.

Figure 15:
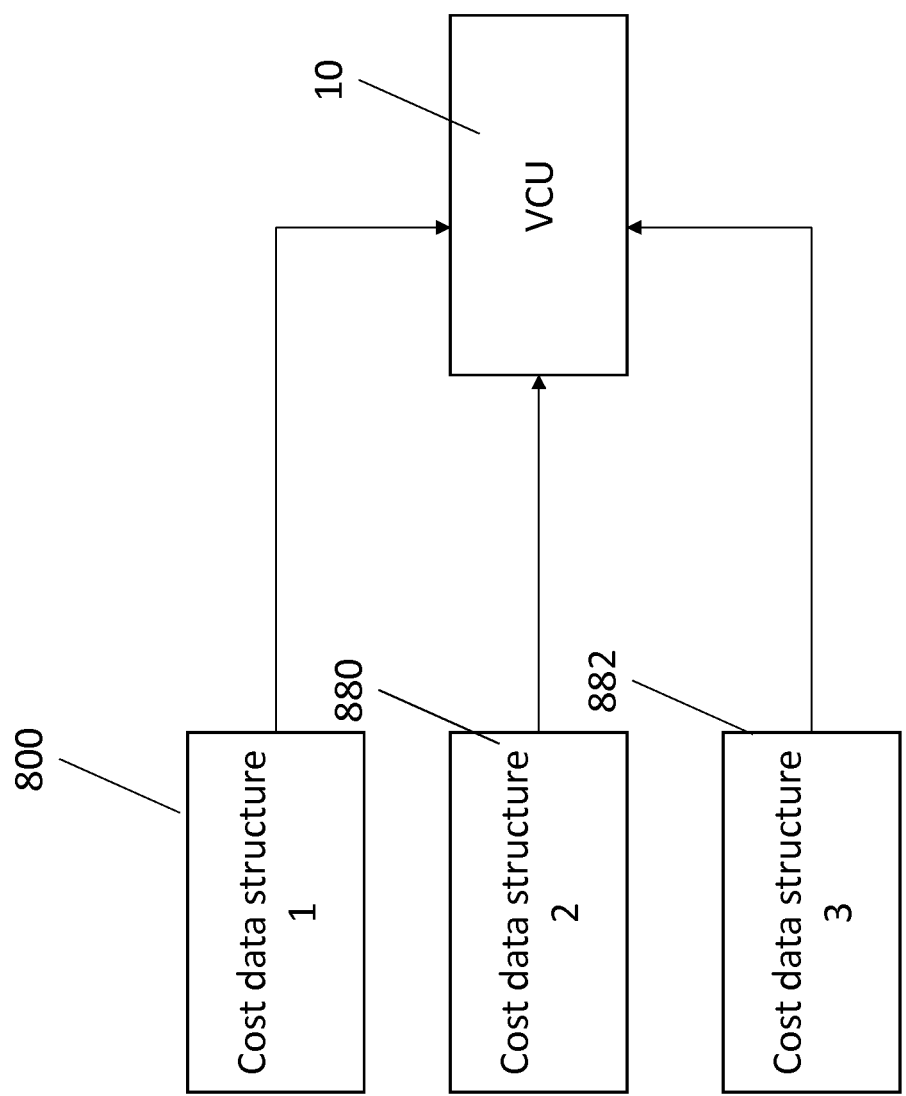
FIG. 15 shows a vehicle control unit of the vehicle of FIGS. 1 and 2 receiving cost data from three different cost data structures.

As before, the stereoscopic camera system 185C may be configured to transmit the line features cost data structure to the VCU 10 (e.g. together with the wheel cost map and/or the body cost map) which may determine the future path of the vehicle 100 in dependence thereon. This is illustrated in FIG. 15, where the VCU 10 receives cost data from the wheel cost map 800, body cost map 880 and line features cost data structure 882. It will be understood that, in some embodiments, cost data from any two or more of the cost data structures 800, 880, 882 may be used by the VCU 10 to determine the vehicle path.

The cost data from the wheel cost map 800, the body cost map 880 and the line features cost data structure 882 may be transmitted from the stereoscopic camera system 185C to the VCU 10 grouped in dependence on the respective portions of the terrain to which it relates. For example, it may be that the stereoscopic camera system 185C is configured to transmit cost data relating to corresponding cells of the wheel and body cost maps together with any line features cost data relating to the same portion of the terrain as part of the same transmitted data structure.

Figure 16:
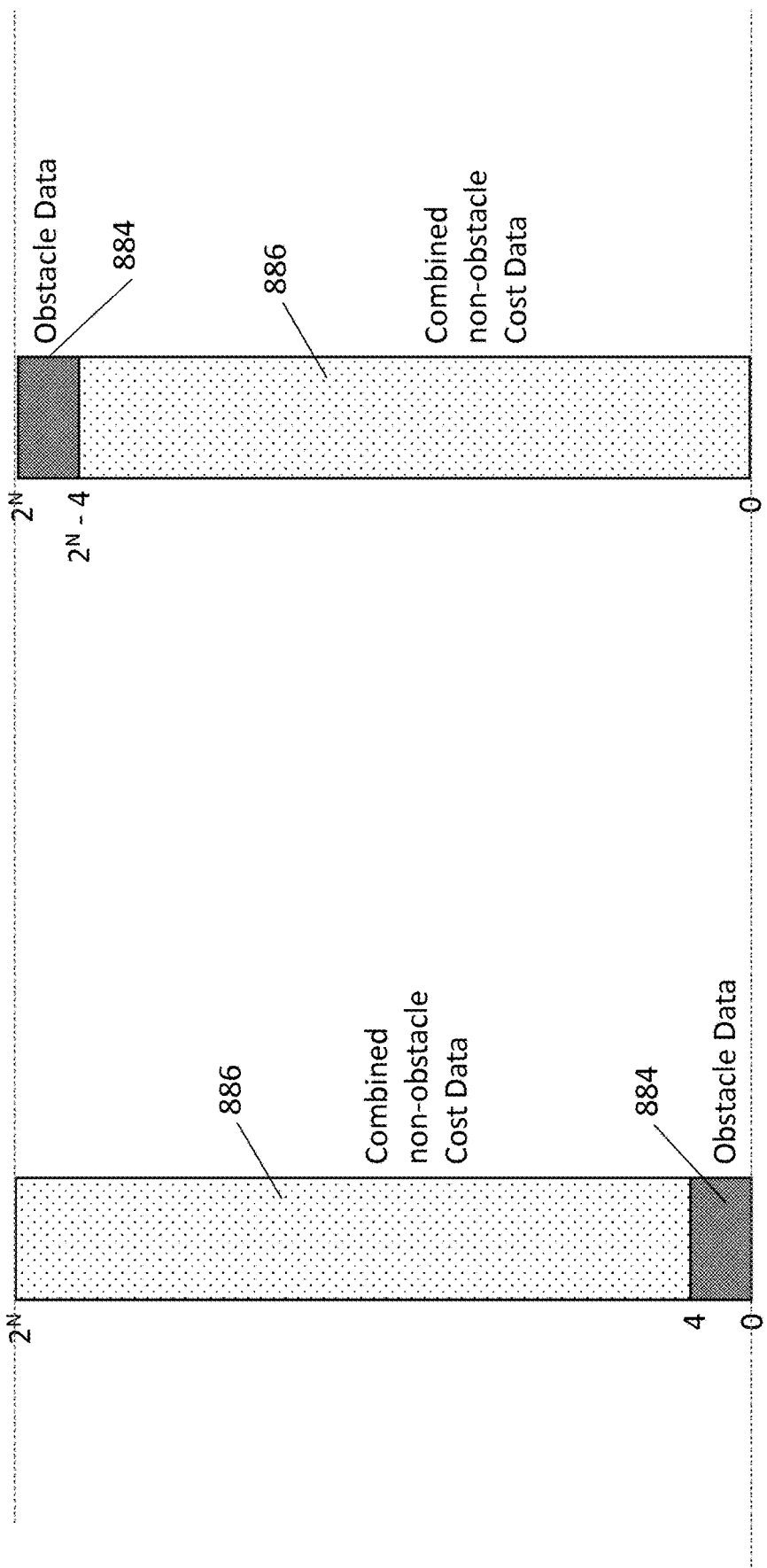
FIGS. 16a and 16b show obstacle data being provided at a predefined portions at the beginning and end of respective transmitted data structures comprising obstacle and non-obstacle data.

In order to determine the transmitted data structure, it may be that the stereoscopic camera system 185C determines whether any of the cells of body cost map 882 contain obstacles. If any of the cells of the body cost map 882 contain obstacles, the stereoscopic camera system 185C may divide the cost data from the wheel cost map 800, the body cost map 880 and the line features cost data structure 882 relating to a particular portion of the terrain into obstacle cost data 884 and non-obstacle cost data 886. As shown in FIGS. 16a and 16b, it may be that the obstacle cost data is provided at a predetermined portion of the transmitted data structure, such as the least significant (e.g. four) bits (FIG. 16a) or the most significant (e.g. four) bits (FIG. 16b). The predefined portion of the transmitted data structure is typically known to the VCU 10. In this case, the VCU 10 may be configured to selectively process the obstacle cost data with a higher priority than non-obstacle cost data when determining the vehicle path. For example, the VCU 10 may discard the non-obstacle data 886. This may be possible because, due to the presence of an obstacle, it may be that the vehicle cannot traverse the portion of the terrain to which the data structure relates. This means that the non-obstacle cost data relating to that portion of the terrain is of less (or indeed of no) importance. By selectively processing the obstacle cost data, processing and battery power of the VCU 10 is saved.

In an alternative example, it may be that the stereoscopic camera system 185C is configured to provide the obstacle cost data 884 to the VCU 10 but not the non-obstacle cost data 886. This may be possible for the same reason discussed above. By not providing the non-obstacle cost data 886 to the VCU 10, bandwidth of the communication medium (e.g. vehicle communications bus or wireless network) by which data is transmitted between the stereoscopic camera system 185C and the VCU 10 is saved, together with processing power of the stereoscopic camera system 185C and the VCU 10.

Thus, it may be that the VCU 10 is configured to determine the vehicle path in dependence on the obstacle cost data 884 relating to one or more portions of the terrain, but not in dependence on the non-obstacle cost data 886 relating to the same portion of the terrain.

In other examples, it may be that the 3D cost data is obtained from another electronic control unit of the vehicle 100, for example from a ranging system of the vehicle such as a radar-based terrain ranging system, a laser-based terrain ranging (e.g. LIDAR) system or an acoustic ranging system of the vehicle. In this case, the camera system of the vehicle need not be stereoscopic and a single 2D camera may be employed. In this case, the preferred path may be determined based on cost data derived from a mapping of image data obtained by the 2D camera relative to a horizontal plane representing the surface of the terrain in a similar way to that described above. The body cost map in this case may be determined and provided to the VCU 10 by the separate, ranging system controller of the ranging system.

The VCU 10 may be configured to perform a feasibility assessment on the selected path to determine whether it is a feasible path for the vehicle to follow. For example, it may be that the VCU 10 is configured to determine whether it is a feasible path for the vehicle to follow in dependence on any one or more of: the width of the path region (e.g. the distance between a pair of typically substantially parallel path boundaries, typically substantially perpendicular to the longitudinal axis of the vehicle); whether the path has parallel boundaries; the continuity of the path boundaries; whether the path emanates from the vehicle 100. If the VCU 10 determines that the path is infeasible, it may be that an alternative preferred path is selected (e.g. from the candidate trajectories shown in FIG. 11) and it is determined whether that path is feasible. This process may be repeated until a feasible path is found.

It may be that the VCU 10 is configured to provide an output representative of the determined path. It may be that the output is a visual output. It may be that the output is an audio visual output. It may be that the output is provided by way of a display and/or speaker system of the vehicle, such as a display and/or speaker system of an infotainment system of the vehicle.

The VCU 10 may then control the vehicle 100 in accordance with the determined path. The VCU 10 may determine a required steering angle for one or more wheels of the vehicle 100 in dependence on the curvature of the determined path, and in dependence thereon transmit a steering angle command signal to the steering controller 170C. The steering controller 170C, in turn, may set the angle of the steerable wheels of the vehicle accordingly. The VCU 10 may also determine a recommended speed of the vehicle in dependence on the curvature of the determined path from the relevant look-up table. The VCU 10 may be configured to output the recommended speed to the LSP control system 12 which controls the speed of the vehicle 100 accordingly by changing the user set speed in accordance with the received recommended speed.

It will be understood that, in alternative examples, the VCU 10 may obtain the image data captured by the stereoscopic camera system 185C, and the VCU 10 (rather than the stereoscopic camera system 185C) may be configured to derive cost data therefrom in the way described above.

It will be understood that the VCU 10 may be configured to add and remove cost data from the global cost map depending on its location, and typically in dependence on a direction of movement of the vehicle 100. This helps to limit the quantity of cost data it needs to store in the global cost map at any given time.

Figure 17:
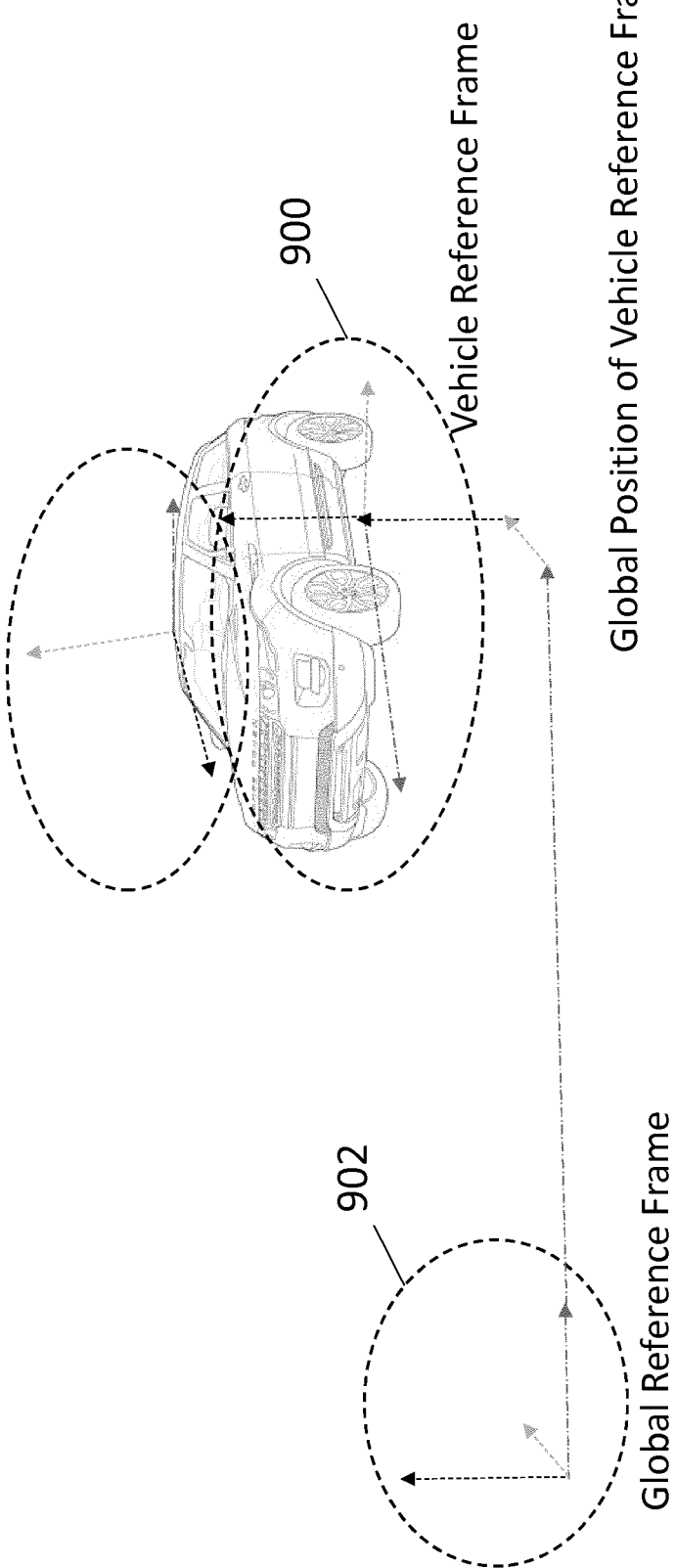
FIG. 17 shows co-ordinate systems for a frame of reference of the vehicle and a global frame of reference.

As shown in FIG. 17, the location and orientation of the vehicle 100 may be defined with respect to its own frame of reference 900 or with respect to a global frame of reference 902. It may be that sensors of the vehicle determine sensor data with respect to the vehicle frame of reference 900. The wheel and body cost maps may be defined with respect to either frame of reference 900, 902. As discussed above, the VCU 10 may determine merged wheel and body cost maps in dependence on sensor data or cost data (e.g. cost maps) obtained from the same (e.g. the stereoscopic camera system 185C) electronic control unit or different electronic control units (e.g. an imaging system and a 3D ranging system) of the vehicle 100. The sensor data on which the cost data is based may be captured at different locations of the vehicle 100, and so may be referenced to those different locations. In this case, updating a cost map which is referenced to the vehicle's frame of reference with cost data which is referenced to the vehicle's frame of reference is computationally difficult and therefore highly processing intensive. Conversely, it has been discovered that merging cost maps which are defined with respect to a global reference (e.g. a globally referenced location and/or a global orientation reference) in dependence on cost or sensor data which is referenced to different globally referenced locations and a global orientation reference is less computationally difficult, and can be achieved more quickly (typically in real time) and/or with less processing power.

Figure 18:
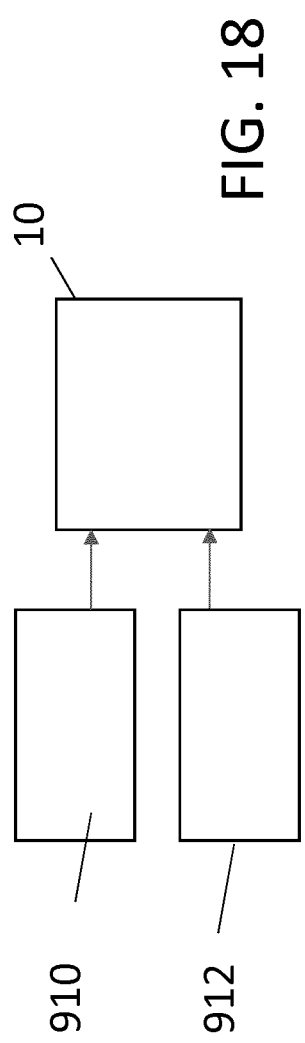
FIG. 18 shows the VCU of the vehicle of FIGS. 1, 2 receiving data from a pair of electronic control units referenced to different globally referenced locations.

For example, as shown in FIG. 18 the VCU 10 may be required to merge a first cost map determined by a first electronic control unit 910 (such as an electronic control unit of a camera system of the vehicle) with a second cost map determined by a second electronic control unit 912 (such as an electronic control unit of a 3D ranging system of the vehicle), for example in order to determine a wheel cost map in dependence on whether portions of the terrain relate to path or non-path regions of the terrain, and in dependence on the gradient of the terrain in the propagation direction of the vehicle and the side slope of the terrain transverse to the propagation direction of the vehicle. For example, cost data relating to whether portions of the terrain relate to path or non-path regions of the terrain may be derived from (e.g. 2D) image data by control unit 910, while cost data relating to the gradient of the terrain in the propagation direction of the vehicle and the side slope of the terrain transverse to the propagation direction of the vehicle may be determined from ranging data by control unit 912. It may be that the first and second cost maps are oriented with respect to the global orientation reference, such as a magnetic pole of the earth.

It may be that the first and second electronic control units 910, 912 are asynchronous such that they capture sensor data at different times. Accordingly, it may be that the first and second cost maps are referenced to different locations. The first and second cost maps may be accompanied by location data, which may for example be determined by visual odometry or inertia odometry or from satellite positioning data (such as Global Positioning System (GPS) positioning data) indicative of the location of the vehicle. For example, the location data may comprise a globally referenced location of the vehicle 100 when the respective sensor data was captured and the globally referenced location of the origin of the respective cost map. The globally referenced location of the vehicle 100 may comprise the globally referenced location of a portion of the vehicle 100 providing a reference point, such as an origin, for a co-ordinate system relating to the vehicle frame of reference 900. This allows motion of vehicle reference frames to be estimated, and for sensor data to be translated to the vehicle frame of reference before being translated to a globally referenced orientation by reference to vehicle orientation information provided by the vehicle's inertial measurement unit (IMU) 23 rather than estimating the global position of the sensor reference frame directly. The global wheel cost map stored by the VCU 10 may be oriented with respect to the global orientation reference, and may comprise an origin referenced to a globally referenced location. The VCU 10 may merge the first and second cost maps received from the first and second control units with the global wheel cost map in dependence on the location data obtained from the respective electronic control units 910, 912.

Figure 19:
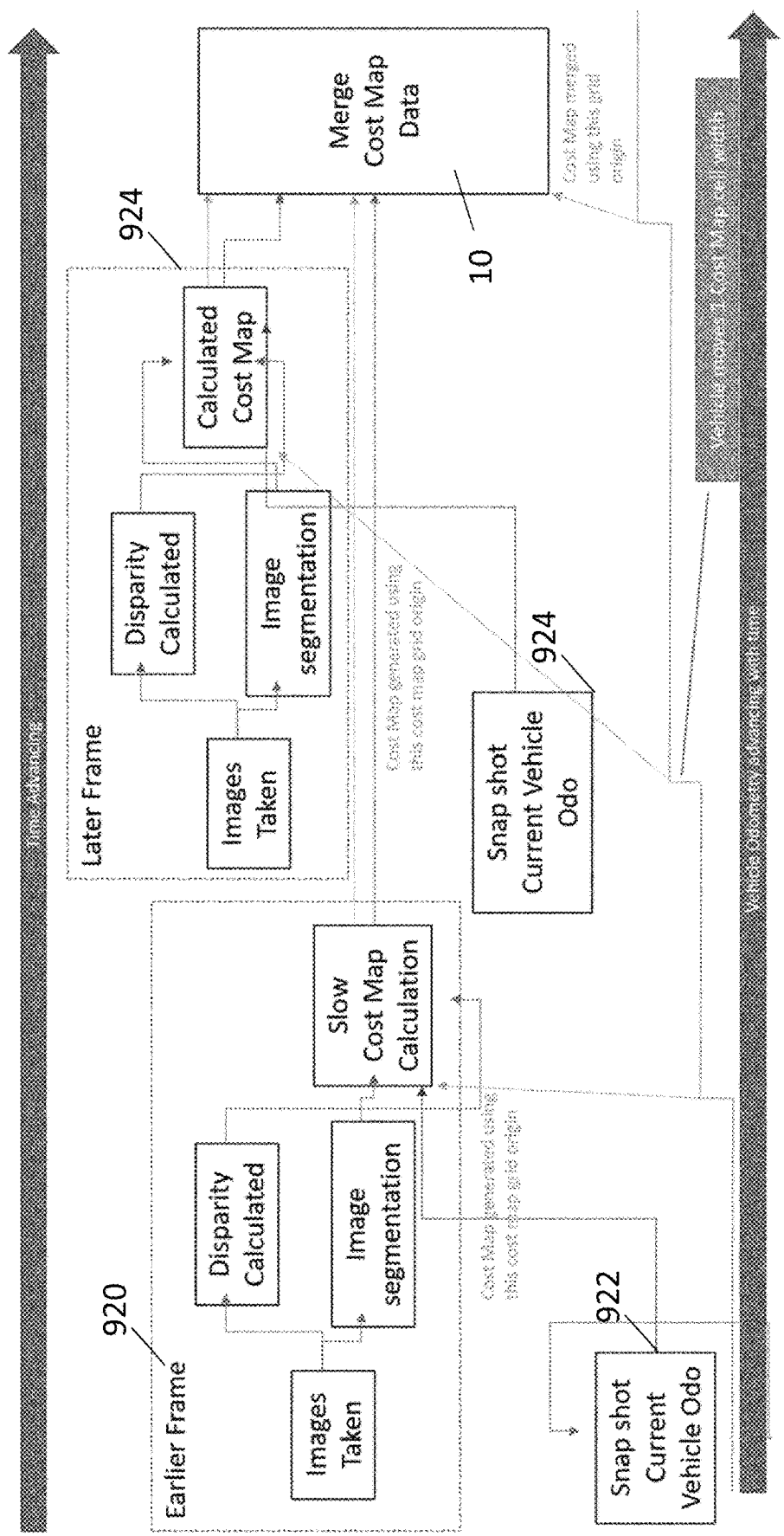
FIG. 19 shows the VCU of the vehicle of FIGS. 1, 2 receiving cost data referenced to different globally referenced locations from a stereoscopic camera system controller.

In another example, as shown in FIG. 19, the VCU 10 may obtain cost data, for example in the form of wheel and body cost maps, from the same electronic control unit, such as an electronic control unit of the stereoscopic camera system 185C, derived from a first, earlier frame 920 of image data referenced to a first location 922 of the vehicle and from a second, later frame 924 of image data referenced to a second location 926 of the vehicle. Again, in each case the cost data may be accompanied by location data comprising a globally referenced location of the vehicle 100 (which again may be the globally referenced location of the co-ordinate system describing the vehicle frame of reference 900) when the respective sensor data was captured and a globally referenced location of the origin of the respective cost map. Again the cost maps may be oriented with respect to a global orientation reference such as a magnetic pole of the earth. The global wheel and body cost maps stored by the VCU 10 may also be oriented with respect to the global orientation reference, and may comprise an origin referenced to a globally referenced location. For the cost maps derived from the respective frames of image data at locations 922, 924, the VCU 10 may merge the wheel and body cost maps received from the control unit with the global wheel and body cost maps respectively in dependence on the respective location data obtained from the control unit. It will be understood that the image data from the first and second frames and the location data may alternatively be provided to the VCU 10 which may itself determine the cost data before updating the global cost maps in dependence on the cost data and the location data as before.

In each case, because the location data is globally referenced, and the global cost maps are defined with respect to a global reference, cost data referenced to different reference locations can be located and spatially combined more easily, thus enabling the global cost maps to be determined in a way that is less processing intensive. The VCU 10 may be configured to determine the future vehicle path in dependence on the updated global cost maps using any of the techniques described herein.

Figure 20:
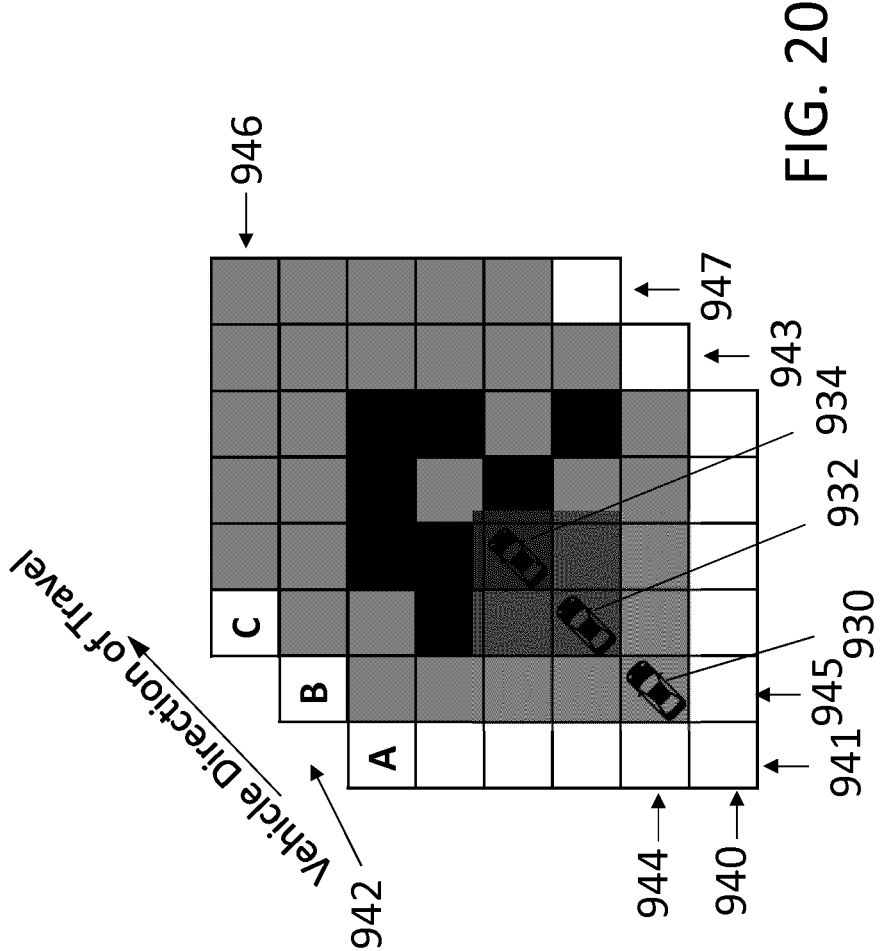
FIG. 20 shows a globally referenced cost map at three different vehicle locations.

Example global cost maps A, B and C for three locations 930, 932, 934 of the vehicle 100 are shown in FIG. 20. In this case, the cost maps A, B and C are each oriented with respect to a global orientation reference, such as the earth's magnetic north. The cost maps A, B and C also comprise an origin (which may be defined as the bottom left hand square of the respective cost map) which is associated with a global location reference. For example, the global location reference may comprise longitude and latitude co-ordinates. As the vehicle 100 travels one grid square of the map north, south, east or west, the global location reference changes accordingly, data is removed from the cost map and new data is added to the cost map, the locations to which the deleted and added cost data relate being dependent on the globally referenced vehicle location. For example, with reference to FIG. 20, when the vehicle 100 moves from location 930 to location 932, the global location reference of the origin changes accordingly, a row 940 and a column 941 of cells of the cost-map are removed and a new row 942 and a new column 943 of cells are added (based on the cost or sensor data obtained from the electronic control unit(s)). This helps to keep the overall amount of electronic memory required to store the cost map substantially the same for different locations of the vehicle 100. Similarly, as the vehicle 100 travels from location 932 to location 934, the global location reference of the origin again changes accordingly, a row 944 and a column 945 of cells of the cost-map are removed and a new row 946 and a new column 947 of cells are added (based on the cost or sensor data obtained from the electronic control unit(s)). When the vehicle 100 turns, the cost map remains oriented with respect to the global orientation reference (rather than following changes in the orientation of the vehicle 100).

It will be understood that any of the processing performed in respect of the present disclosure may additionally or alternatively be performed by any processors of the vehicle 100 (or even processors external to the vehicle, for example in communication with the vehicle by way of a wireless network). For example, processing operations performed by the camera system 185C may be performed by the VCU 10 (and/or vice versa).

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/ or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The following numbered clauses define various further aspects and features of the present technique:

1. A control system for a vehicle, the control system comprising at least one controller and being configured to:
   obtain image data relating to terrain to be traversed by the vehicle, and for each of a plurality of sub-regions of the image data:
   determine path probability data indicative of a probability that the respective sub-region relates to a path region of the terrain;
   determine non-path probability data indicative of a probability that the respective sub-region relates to a non-path region of the terrain; and
   determine a cost for the vehicle to traverse a respective portion of the terrain to which the respective sub-region relates in dependence on the determined path and non-path probability data; and
   determine a vehicle path in dependence on the determined costs.

2. A control system according to clause 1 wherein the at least one controller collectively comprises:
   at least one electronic processor having an input for receiving the image data; and
   at least one electronic memory device electrically coupled to the at least one electronic processor and having instructions stored therein,
   wherein the at least one electronic processor is configured to access the at least one memory device and execute the instructions thereon to determine the path probability data, the non-path probability data, the costs and the vehicle path.

3. A control system according to clause 1 or clause 2 wherein the control system is configured to control the vehicle in dependence on the determined path.

4. A control system according to any one preceding clause wherein the control system is configured to, for each of the said sub-regions: infer secondary path probability data from the non-path probability data, the secondary path probability data being indicative of a probability that the respective sub-region relates to a path region of the terrain; and determine a cost for the vehicle to traverse a respective portion of the terrain to which the respective sub-region relates based on a combination of the path probability data and the secondary path probability data.

5. A control system according to clause 4 wherein the control system is configured to combine the path probability data with the secondary path probability data by applying different weights to the path probability data and the secondary path probability data and combining the weighted path probability data and the weighted secondary path probability data.

6. A control system according to any preceding clause wherein the control system is configured to, for each of the said sub-regions, determine path probability data indicative of a probability that the respective sub-region relates to a path region of the terrain by: determining image content data from the respective sub-region; and comparing the image content data to a path model relating to the path region of the terrain.

7. A control system according to clause 6 wherein the path model is dependent on historical image data relating to the terrain.

8. A control system according to clause 7 wherein the path model is based on tyre region image data relating to locations on the terrain of one or more tyres of the vehicle.

9. A control system according to any of clauses 6 to 8 wherein the control system is configured to determine the path model in dependence on one or more of the said sub-regions of the said image data relating to location(s) on the terrain of one or more tyres of the vehicle.

10. A control system according to clause 9 wherein the control system is configured to determine the one or more sub-regions of the said image data relating to location(s) on the terrain of one or more tyres of the vehicle in dependence on location data indicative of a location of the vehicle at a time after the image data was captured.

11. A control system according to any one of clauses 6 to 10 wherein the control system is configured to: determine first tyre region image content data from one or more sub-regions of the image data relating to a location of a first tyre of the vehicle; determine second tyre region image content data from one or more sub-regions of the image data relating to a location of a second tyre of the vehicle; compare the first tyre region image content data to the second tyre region image content data; and, in dependence on the first and second tyre region image content data meeting one or more similarity criteria with respect to each other, determine the path model in dependence on the first and second tyre region image content data.

12. A control system according to any one of clauses 6 to 11 wherein the control system is configured to: determine tyre region image content data from one or more sub-regions of the image data relating to a location of a tyre of the vehicle; compare the tyre region image content data to the path model; and, in dependence on the tyre region image content data and the path model meeting one or more similarity criteria with respect to each other, update the path model in dependence on the tyre region image content data.

13. A control system according to any preceding clause wherein the control system is configured to, for each of the said sub-regions, determine the non-path probability data indicative of a probability that the respective sub-region relates to a non-path region of the terrain by: determining image content data relating to the respective sub-region from the said image data; and comparing the image content data relating to the respective sub-region to a non-path model relating to the non-path region of the terrain.

14. A control system according to clause 13 wherein the non-path model is dependent on historical image data relating to the terrain.

15. A control system according to clause 12 wherein the non-path model is dependent on image data relating to one or more non-path regions of the terrain laterally offset from the vehicle.

16. A control system according to clause 15 wherein the non-path model is based on image data relating to one or more non-path regions of the terrain laterally offset from the vehicle by a set distance, the control system being configured to determine the set distance by: determining image content data from a plurality of sub-regions of image data relating to respective portions of the terrain laterally offset from the vehicle; comparing the image content data to the path model to thereby determine one or more sub-regions having image contents which meet one or more dissimilarity criteria with respect to the path model; and determining the set distance in dependence on lateral distance(s) between the vehicle and respective portions of the terrain to which the said one or more dissimilar sub-regions relate.

17. A control system according to clause 16 wherein the control system is configured to determine the non-path model based on one or more sub-regions of the image data relating to one or more non-path regions of the terrain laterally offset from the vehicle by the set distance.

18. A control system according to clause 16 or clause 17 wherein the control system is configured to: determine image content data from one or more sub-regions of the image data relating to respective portions of the terrain laterally offset from the vehicle by the set distance; compare the image content data to the path model; and, in dependence on the image content data relating to one or more of the said sub-regions meeting one or more dissimilarity criteria with respect to the path model, determine the non-path model in dependence on the dissimilar image content data.

19. A control system according to any one of clauses 13 to 17 as dependent on any one of clauses 6 to 12 wherein the control system is configured to: determine tyre region image content data from one or more sub-regions of the image data relating to a location of a tyre of the vehicle; compare the tyre region image data with the non-path model; and, in dependence on the tyre region image content data and the non-path model meeting one or more dissimilarity criteria with respect to each other, determine the path model in dependence on the tyre region image content data.

20. A control system according to any one of clauses 6 to 12 or on any one of clauses 13 to 19 as dependent on any one of clauses 6 to 12 wherein the control system is configured to: determine that a selected portion of a sub-region meets one or more similarity criteria with respect to the path model; and in dependence thereon selectively update the path model in dependence on the first portion of the sub-region.

21. A control system according to any preceding clause wherein the control system is configured to: obtain 3D data in respect of the terrain; and, for respective portions of the terrain relating to each of a plurality of the said sub-regions, determine the cost for the vehicle to traverse the respective portion of the terrain to which the respective sub-region relates in dependence on the determined path and non-path probability data and on the 3D data.

22. A vehicle comprising a control system according to any one of clauses 1 to 20.

23. A method of determining a vehicle path, the method comprising:
obtaining image data relating to terrain to be traversed by the vehicle, and for each of a plurality of sub-regions of the image data:
determining path probability data indicative of a probability that the respective sub-region relates to a path region of the terrain;
determining non-path probability data indicative of a probability that the respective sub-region relates to a non-path region of the terrain; and
determining a cost for the vehicle to traverse a respective portion of the terrain to which the respective sub-region relates in dependence on the determined path and non-path probability data; and
determining a vehicle path in dependence on the determined costs or outputting determined costs in dependence on which a vehicle path can be determined.

24. A computer program product comprising computer readable instructions that, when executed by a computer, cause performance of the method of clause 23.

25. A non-transitory computer readable medium comprising computer readable instructions that, when executed by a processor, cause performance of the method of clause 23.

The invention claimed is:

1. A control system for a vehicle, the control system comprising at least one controller and being configured to:
obtain image data relating to terrain to be traversed by the vehicle, and for each of a plurality of sub-regions of the image data:
determine probability data relating to whether the respective sub-region relates to a path region or a non-path region of the terrain; and
determine a cost for the vehicle to traverse a portion of the terrain to which the sub-region relates depending on the probability data meeting one or more path probability criteria indicating that the sub-region relates to the path region, one or more non-path probability criteria indicating that the sub-region relates to the non-path region or neither the path probability criteria nor the non-path probability criteria;
determine a vehicle path in dependence on the determined costs; and
control the vehicle in dependence on the determined vehicle path and/or provide an audio and/or visual output representative of the determined path;
wherein the control system is configured to, for each of the said sub-regions, determine a different cost for the respective sub-region depending on whether the probability data meets one or more path probability criteria, one or more non-path probability criteria or neither the path probability criteria nor the non-path probability criteria, the determined cost being selected from at least a first cost when the probability data meets one or more path probability criteria, a second cost when the probability data meets one or more non-path probability criteria and a third cost when the probability data meets neither the path probability criteria nor the non-path probability criteria.

2. A control system according to claim 1 wherein the at least one controller collectively comprises:
at least one electronic processor having an input for receiving the image data; and
at least one electronic memory device electrically coupled to the at least one electronic processor having instructions stored therein,
wherein the at least one electronic processor is configured to access the at least one memory device and execute the instructions thereon so as to determine the probability data, the cost data and the vehicle path.

3. A control system according to claim 2 wherein the control system is configured to control the vehicle in dependence on the determined vehicle path.

4. A control system according to claim 1 wherein the control system is configured, for each of the said sub-regions, to determine the probability data by: determining, from the image data, image content data relating to the said sub-region; and comparing the image content data to a path model relating to the path region of the terrain.

5. A control system according to claim 4 wherein the path model is dependent on historical image data relating to the terrain.

6. A control system according to claim 5 wherein the path model is based on tyre region image data relating to locations on the terrain of one or more tyres of the vehicle.

7. A control system according to claim 5 wherein the control system is configured to determine the path model in dependence on one or more of the said sub-regions of the said image data relating to location(s) on the terrain of one or more tyres of the vehicle, the control system being configured to determine the one or more sub-regions of the said image data relating to location(s) on the terrain of one or more tyres of the vehicle in dependence on location data indicative of a location of the vehicle at a time after the image data was capture.

8. A control system according to claim 7 wherein the control system is configured to determine the said location data by performing visual odometry or inertial odometry in respect of the vehicle.

9. A control system according to claim 1 wherein the control system is configured to, for each of the said sub-regions, determine the probability data by: determining, from the image data, image content data relating to the said sub-region; and comparing the image content data to a non-path model.

10. A control system according to claim 9 wherein the non-path model is dependent on historical image data relating to the terrain.

11. A control system according to claim 10 wherein the non-path model is based on image data relating to one or more non-path regions of the terrain laterally offset from the vehicle.

12. The control system according to claim 1 wherein the control system is configured to, for each of the said sub-regions: determine the probability data by: determining image content data from the said sub-region; comparing the image content data to a path model to determine path probability data relating to a probability that the sub-region relates to the path region of the terrain; comparing the image content data to a non-path model to determine non-path probability data relating to a probability that the sub-region relates to the non-path region of the terrain; and determining the said probability data based on the said path and non-path probability data.

13. A control system according to claim 1 wherein the control system is configured to:
for each of a plurality of candidate trajectories of the vehicle across the terrain: determine candidate trajectory cost data in dependence on the determined costs for the vehicle to traverse at least some of the sub-regions traversed by the candidate trajectory, the candidate trajectory cost data relating to a cost for the vehicle to traverse at least a portion of the respective candidate trajectory; and determine the vehicle path by selecting a candidate trajectory from the said plurality of candidate trajectories in dependence on the candidate trajectory cost data, and/or
obtain 3D data in respect of the terrain; and, for respective portions of the terrain relating to each of a plurality of the said sub-regions, determine the cost for the vehicle to traverse the respective portion of the terrain to which the respective sub-region relates in dependence on the 3D data.

14. A control system according to claim 1 wherein the control system is configured to determine a cost map for the vehicle in dependence on the determined costs for the vehicle to traverse the sub-regions, wherein the cost map is defined with respect to a global reference.

15. A control system according to claim 14 wherein the cost map has a reference point associated with a globally referenced location and wherein the globally referenced location of the cost map changes in dependence on translation of the vehicle across the terrain, the cost map remaining oriented with respect to the global reference, and wherein the control system is configured to add and/or remove cost data from the cost map in dependence on a change of the globally referenced location.

16. A control system according to claim 14 wherein the cost map is oriented with respect to a global orientation reference.

17. A control system according to claim 14 wherein the at least one controller comprises a controller configured to obtain first data referenced to a first globally referenced location and second data referenced to a second globally referenced location and to determine the cost map in dependence on the first and second data and wherein the controller is configured to: obtain location data relating to each of the first and second data; and determine the cost map in dependence on the location data.

18. A vehicle comprising a control system according to claim 1.

19. A method of determining a vehicle path comprising:
obtaining image data relating to terrain to be traversed by the vehicle, and for each of a plurality of sub-regions of the image data:
determining probability data relating to whether the respective sub-region relates to a path region or a non-path region of the terrain; and
determining a cost for the vehicle to traverse a portion of the terrain to which the sub-region relates depending on the probability data meeting one or more path probability criteria indicating that the sub-region relates to the path region, one or more non-path probability criteria indicating that the sub-region relates to the non-path region or neither one or more path probability criteria nor one or more non-path probability criteria;

determining a vehicle path in dependence on the determined costs or outputting determined costs in dependence on which a vehicle path can be determined; and controlling the vehicle in dependence on the determined vehicle path and/or provide an audio and/or visual output representative of the determined path;

wherein the control system is configured to, for each of the said sub-regions, determine a different cost for the respective sub-region depending on whether the probability data meets one or more path probability criteria, one or more non-path probability criteria or neither the path probability criteria nor the non-path probability criteria, the determined cost being selected from at least a first cost when the probability data meets one or more path probability criteria, a second cost when the probability data meets one or more non-path probability criteria and a third cost when the probability data meets neither the path probability criteria nor the non-path probability criteria.

20. A non-transitory computer readable medium comprising computer readable instructions that, when executed by a processor, cause performance of the method of claim 19.

\* \* \* \* \*